(12) United States Patent
Kazui et al.

(10) Patent No.: US 9,621,886 B2
(45) Date of Patent: Apr. 11, 2017

(54) MOTION VIDEO ENCODING APPARATUS, MOTION VIDEO ENCODING METHOD, AND MOTION VIDEO ENCODING COMPUTER PROGRAM

(71) Applicant: FUJITSU LIMITED, Kawasaki-shi, Kanagawa (JP)

(72) Inventors: Kimihiko Kazui, Kawasaki (JP); Satoshi Shimada, Kawasaki (JP); Akira Nakagawa, Sagamihara (JP); Hidenobu Miyoshi, Kawasaki (JP); Junpei Koyama, Shibuya (JP)

(73) Assignee: FUJITSU LIMITED, Kawasaki (JP)

( * ) Notice: Subject to any disclaimer, the term of this patent is extended or adjusted under 35 U.S.C. 154(b) by 643 days.

(21) Appl. No.: 13/851,560

(22) Filed: Mar. 27, 2013

(65) Prior Publication Data

US 2013/0208793 A1 Aug. 15, 2013

Related U.S. Application Data

(63) Continuation of application No. PCT/JP2011/050462, filed on Jan. 13, 2011.

(30) Foreign Application Priority Data

Sep. 30, 2010 (JP) ................................. 2010-222247

(51) Int. Cl.
H04N 19/00 (2014.01)
H04N 19/176 (2014.01)
(Continued)

(52) U.S. Cl.
CPC ....... *H04N 19/00569* (2013.01); *H04N 19/13* (2014.11); *H04N 19/132* (2014.11);
(Continued)

(58) Field of Classification Search
CPC ........... H04N 19/00569; H04N 19/105; H04N 19/107; H04N 19/117; H04N 19/156;
(Continued)

(56) References Cited

U.S. PATENT DOCUMENTS 5,235,618 A 8/1993 Sakai et al.
6,654,421 B2 * 11/2003 Hanamura ......... H04N 21/2343
348/699

(Continued)

FOREIGN PATENT DOCUMENTS

JP 3-148981 6/1991
JP 9-93537 4/1997
(Continued)

OTHER PUBLICATIONS

ISO, ISO/IEC 14496-10; 2004; International Standard, 2nd Edition; pp. 1-280.*

(Continued)

*Primary Examiner* — Peter D Le
(74) *Attorney, Agent, or Firm* — Staas & Halsey LLP

(57) ABSTRACT

A motion video encoding apparatus includes: a group determining unit which determines to which of a plurality of groups each block belongs; a group decode time information computing unit which computes a decode time for each of the groups; a group information appending unit which appends group information identifying the group to which each block belongs to data to be output; a code amount control unit which controls an amount of code for each block contained in the group so that data needed for decoding all the blocks contained in the group will arrive at a stream receive buffer provided in a motion video decoding apparatus by the decode time of the group when the data is transmitted to the motion video decoding apparatus at a prescribed transmission rate; and an encode processing unit (Continued)

which encodes each block, based on control information concerning the amount of code.

6 Claims, 17 Drawing Sheets

(51) Int. Cl.
*H04N 19/50* (2014.01)
*H04N 19/70* (2014.01)
*H04N 19/46* (2014.01)
*H04N 19/13* (2014.01)
*H04N 19/132* (2014.01)
*H04N 19/152* (2014.01)
*H04N 19/124* (2014.01)

(52) U.S. Cl.
CPC ......... *H04N 19/152* (2014.11); *H04N 19/176* (2014.11); *H04N 19/46* (2014.11); *H04N 19/70* (2014.11); *H04N 19/124* (2014.11)

(58) Field of Classification Search
CPC .... H04N 19/17; H04N 19/174; H04N 19/176; H04N 19/182; H04N 19/52; H04N 19/55; H04N 19/59; H04N 19/593; H04N 19/86
See application file for complete search history.

(56) References Cited

U.S. PATENT DOCUMENTS

| | | | |
|---|---|---|---|
| 2001/0031002 A1 | 10/2001 | Hashimoto et al. | |
| 2001/0046263 A1* | 11/2001 | Yamada | H04N 21/6377 375/240.12 |
| 2002/0001344 A1 | 1/2002 | Morris et al. | |
| 2004/0047423 A1 | 3/2004 | Viscito et al. | |
| 2006/0088094 A1 | 4/2006 | Cieplinski et al. | |
| 2010/0246662 A1* | 9/2010 | Koto | H04N 19/00193 375/240.1 |

FOREIGN PATENT DOCUMENTS

| | | |
|---|---|---|
| JP | 11-355230 | 12/1999 |
| JP | 2001-346201 | 12/2001 |
| JP | 2003-535523 | 11/2003 |
| JP | 2010-232720 | 10/2010 |
| KR | 10-2006-0066737 | 6/2006 |
| WO | 98/32281 | 7/1998 |
| WO | 02/25951 A2 | 3/2002 |

OTHER PUBLICATIONS

Office Action dated Jul. 29, 2014 in corresponding Japanese Patent Application No. 2012-536233.
"Comprehensive Multimedia Selected Books MPEG", Institute of Image Information and Television Engineers, Jul. 1998, pp. 82-83.
Office Action dated Apr. 30, 2015 in corresponding Korean Patent Application No. 10-2015-7002906.
International Search Report for corresponding international application PCT/JP2011/050462 mailed Apr. 12, 2011.
Martin Winken et al., "Description of video coding technology proposal by Fraunhofer HHI", JCTVC-A116, Joint Collaborative Team on Video Coding (JCT-VC) of ITU-T SG16 WP3 and ISO/IEC JTC1/SC29/WG11, 1st Meeting: Dresden, Germany, Apr. 2010, pp. 1-44.
"MPEG-2 Test Model 5", ISO-IEC//JTC1/SC29/WG11/N0400, Apr. 1993, 37 pp.
Office Action mailed Feb. 28, 2014 in corresponding Korean Application No. 10-2013-7010375.
Office Action dated Oct. 20, 2015 in corresponding Japanese Patent Application No. 2014-220876.
Office Action dated Jul. 3, 2015 in corresponding Chinese Patent Application No. 201180051895.6.
Extended European Search Report dated Dec. 5, 2014 in corresponding European Patent Application No. 11828481.9.

* cited by examiner

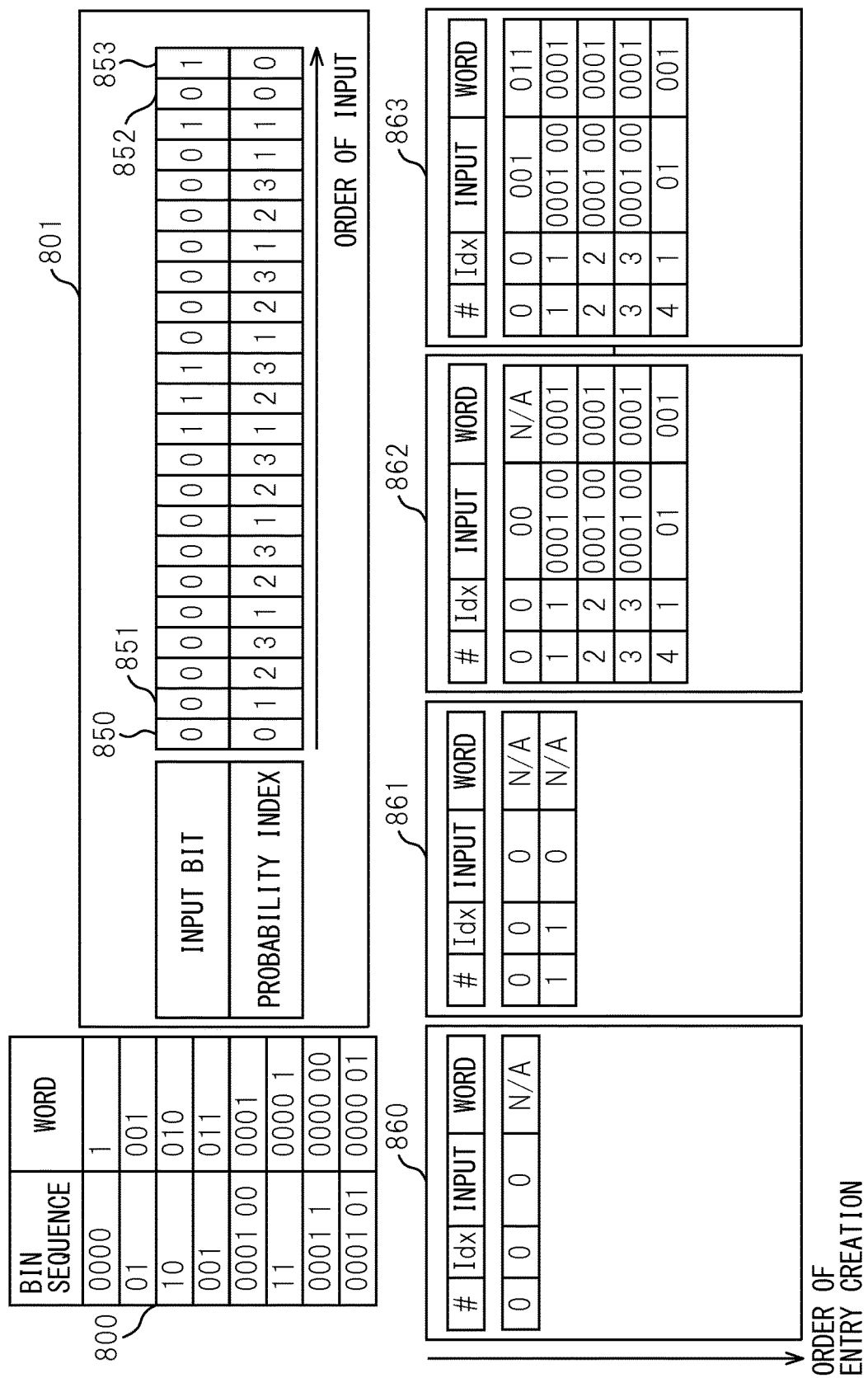

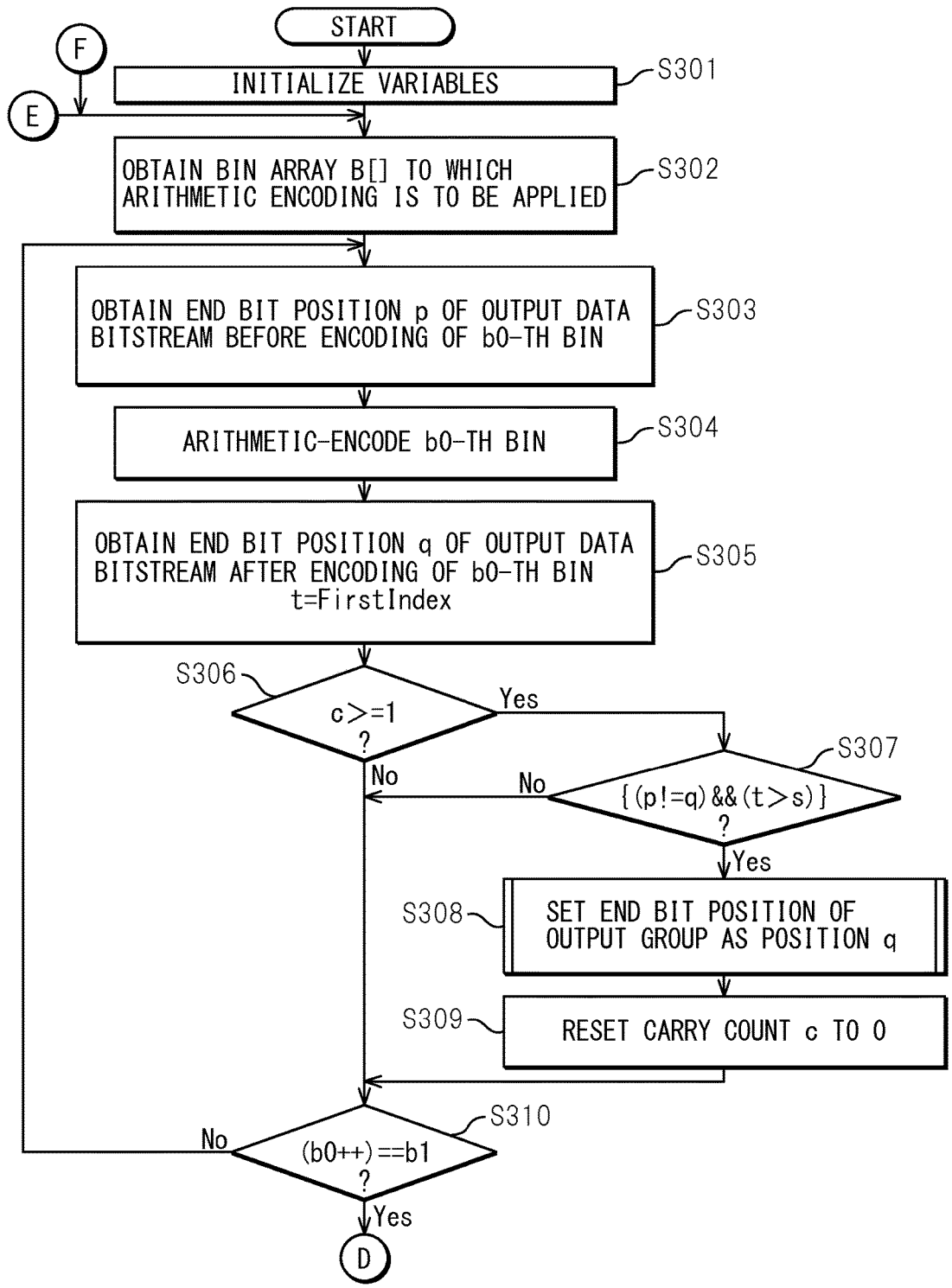

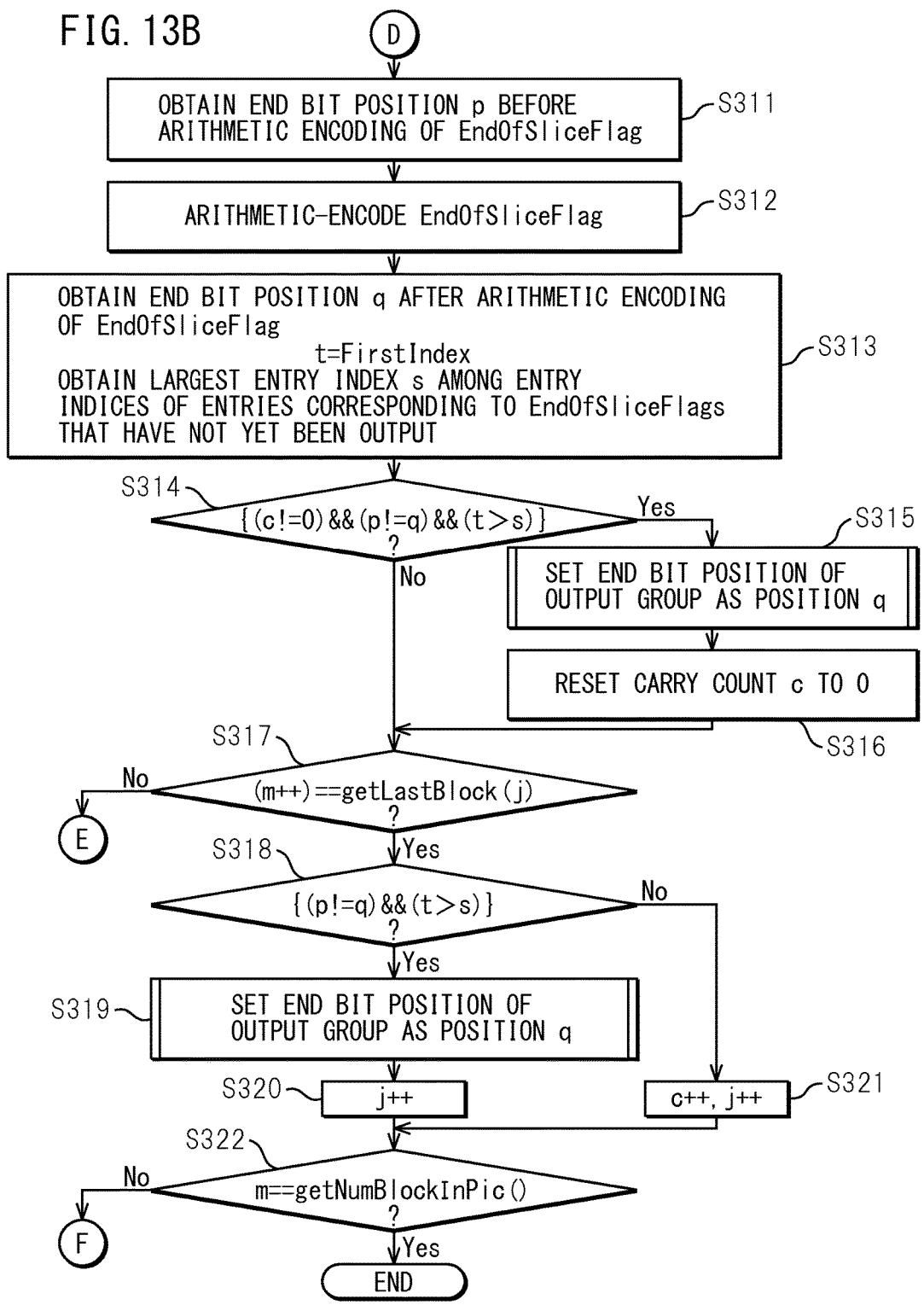

MOTION VIDEO ENCODING APPARATUS, MOTION VIDEO ENCODING METHOD, AND MOTION VIDEO ENCODING COMPUTER PROGRAM

CROSS-REFERENCE TO RELATED APPLICATION

This application is a continuation application and is based upon PCT/JP2011/050462, filed on Jan. 13, 2011, which claims priority of the prior Japanese Patent Application No. 2010-222247, filed Sep. 30, 2010, the entire contents of which are incorporated herein by reference.

FIELD

The present invention relates to a motion video encoding apparatus, motion video encoding method, and motion video encoding computer program for encoding each picture on a block-by-block basis, for example, by dividing the picture into a plurality of blocks.

BACKGROUND

According to recent motion video encoding techniques, each picture is encoded using different coding modes having different compression efficiencies. For example, a picture is encoded as an intra-predicted picture (I picture), which is a picture encoded using only intra-picture prediction, or as a unidirectionally predicted picture (P picture) or bidirectionally predicted picture (B picture), which is a picture encoded using inter-picture prediction. Since the amount of code that occurs differs according to the type of the picture or the complexity of the image, the amount of code tends to vary from one time to the next. As a result, to transmit a data stream containing encoded motion video at a constant transmission rate, a transmit buffer and a receive buffer for buffering the stream have to be provided. The delay caused by this buffering is one of the factors that cause a display delay at the motion video decoder end. If the buffer size is reduced, the buffer delay can be reduced at the motion video decoder end, though the picture quality tends to degrade, because the degree of freedom in distributing the amount of code among the pictures decreases.

International motion video coding standards currently in widespread use, such as MPEG-2 Video (ISO/IEC 13818-2/ITU-T H.262, hereinafter referred to as MPEG-2) and MPEG-4 AVC/H.264 (ISO/IEC 14496-10/ITU-T H.264, hereinafter referred to as H.264), provide for the operation of a stream receive buffer in an idealized decoder referred to as the video buffering verifier (VBV) or the coded picture buffer (CPB), respectively. A motion video encoder has to control the amount of code so that the receive buffer in the idealized decoder neither overflows nor underflows. It is stipulated that the idealized decoder performs instantaneous decoding that takes zero time to decode. Patent document 1, for example, discloses a moving video encoder control method concerning the VBV.

PRIOR ART DOCUMENTS

Patent document

[Patent document 1] Japanese Laid-open Publication No. H03-148981

Non-Patent Documents

[Non-patent document 1] MPEG-2 Test Model 5, April 1993, ISO-IEC/JTC1/SC29/WG11/N0400

[Non-patent document 2] JCTVC-A116, "Description of video coding technology proposal by Fraunhofer HHI," Joint Collaborative Team on Video Coding of ITU-T SG16 WP3 and ISO/IEC JTC1/SC29/WG11, April 2010

SUMMARY

In order not to cause the receive buffer in the idealized decoder to overflow or underflow, the moving video encoder controls the amount of code to guarantee that all the data of any given picture will have been stored in the receive buffer by the time the idealized decoder decodes that given picture.

When the motion video encoder is transmitting a data stream at a constant transmission rate, if the amount of code of each picture is large, a receive buffer underflow may occur which is a state in which some of the data needed to decode the picture is not yet stored in the decoder's receive buffer when the picture is to be decoded and displayed by the motion video decoder. If this happens, the motion video decoder will become unable to perform decoding, and frame skipping will occur.

The motion video decoder therefore displays the picture after delaying the stream by a prescribed time from its receive time so that the decoding can be done without causing the receive buffer to underflow.

As described above, it is stipulated that the idealized decoder accomplishes decoding in zero time. As a result, if the input time of the i-th picture to the motion video encoder is $t(i)$, and the decode time of the i-th picture at the idealized decoder is $dt(i)$, then the time at which the picture becomes ready for display is also $dt(i)$. Since the picture display period $\{t(i+1)-t(i)\}$ is equal to $\{dt(i+1)-dt(i)\}$ for any picture, the decode time $dt(i)$ is given as $dt(i)=t(i)+dly$, i.e., the time delayed by a fixed time dly from the input time $t(i)$. This means that the motion video encoder has to complete the transmission of all the data needed for decoding to the receive buffer by the time $dt(i)$.

Referring to FIG. 1, a description will be given of how the conventional receive buffer operates. In FIG. 1, the abscissa represents the time, and the ordinate represents the buffer occupancy of the receive buffer. Solid line graph 100 depicts the buffer occupancy as a function of time.

The buffer occupancy of the receive buffer is restored at a rate equal to the transmission rate, and the data used for decoding each picture is retrieved from the buffer at the decode time of the picture. The data of the i-th picture begins to be input to the receive buffer at time $at(i)$, and the final data of the i-th picture is input at time $ft(i)$. The idealized decoder completes the decoding of the i-th picture at time $dt(i)$, whereupon the i-th picture becomes ready for display.

While the idealized decoder is an instantaneous decoder, the actual motion video decoder takes a finite time to decode a picture; generally, the decoding processing time for one picture is shorter than the picture display period, but the decoding takes a time close to the picture display period. The data of the i-th picture is input to the receive buffer during the period starting at time $at(i)$ and ending at time $ft(i)$, but there is no guarantee at which of the times $at(i)$ to $ft(i)$ the data needed for decoding a given block will arrive. The actual motion video decoder therefore begins to decode the i-th picture at time $ft(i)$. As a result, the actual motion video decoder can only guarantee to complete the decoding by time $ft(i)+ct$, where ct is the worst-case processing time needed to decode one picture.

What the actual motion video encoder guarantees is that the data needed for decoding the picture will arrive at the decoder's receive buffer by the time $dt(i)$, i.e., $ft(i)$ will not be later than dt(i). As a result, when the delay of ft(i) is the longest, ft(i) becomes equal to dt(i). In this case, the time at which the decoding is guaranteed to complete is dt(i)+ct. If all the pictures are to be displayed at a constant picture rate, the motion video decoder has to delay the display time of each picture at least by ct compared with the idealized decoder.

According to one embodiment, a motion video encoding apparatus for encoding each picture contained in motion video data by dividing the picture into a plurality of blocks is provided. The motion video encoding apparatus includes: a group determining unit which determines to which of a plurality of groups each block belongs; a group decode time information computing unit which computes a decode time for each of the groups; a group information appending unit which appends group information identifying the group to which each block belongs to data to be output; a code amount control unit which controls an amount of code for each block contained in the group so that data needed for decoding all the blocks contained in the group will arrive at a stream receive buffer provided in a motion video decoding apparatus by the decode time of the group computed by the group decode time information computing unit when the data is transmitted to the motion video decoding apparatus at a prescribed transmission rate; and an encode processing unit which encodes each block, based on control information concerning the amount of code.

According to another embodiment, a motion video encoding method for encoding each picture contained in motion video data by dividing the picture into a plurality of blocks is provided. The motion video encoding method includes: determining to which of a plurality of groups each block belongs; computing a decode time for each of the groups; appending group information identifying the group to which each block belongs to data to be output; controlling an amount of code for each block contained in the group so that data needed for decoding all the blocks contained in the group will arrive at a stream receive buffer provided in a motion video decoding apparatus by the decode time of the group when the data is transmitted to the motion video decoding apparatus at a prescribed transmission rate; and encoding each block, based on control information concerning the amount of code.

According to still another embodiment, a motion video encoding computer program for encoding each picture contained in motion video data by dividing the picture into a plurality of blocks is provided. The motion video encoding computer program includes instructions for causing a computer to execute the steps of: determining to which of a plurality of groups each block belongs; computing a decode time for each of the groups; appending group information identifying the group to which each block belongs to data to be output; controlling an amount of code for each block contained in the group so that data needed for decoding all the blocks contained in the group will arrive at a stream receive buffer provided in a motion video decoding apparatus by the decode time of the group when the data is transmitted to the motion video decoding apparatus at a prescribed transmission rate; and encoding each block, based on control information concerning the amount of code.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a diagram for explaining the behavior of a bin encoding unit and a multiplexing unit in the variable-length encoding unit according to the fourth embodiment.

FIGS. 13A to 13C are a flowchart for deriving the end bit position of a block variable-length encoded by the variable-length encoding unit according to the fourth embodiment.

DESCRIPTION OF EMBODIMENTS

A motion video encoding apparatus according to one embodiment will be described below with reference to drawings.

Figure 2:
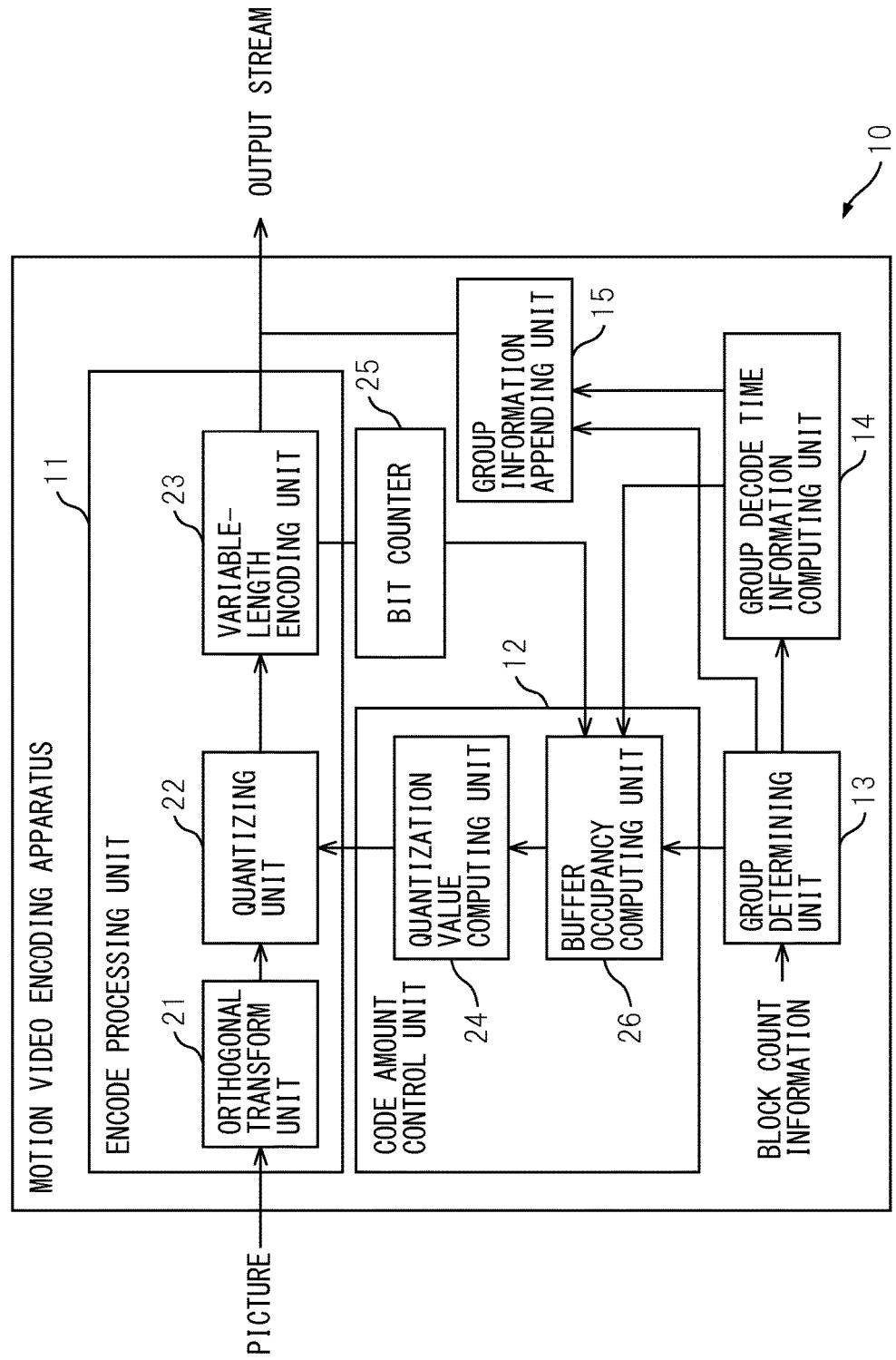
FIG. 2 is a diagram schematically illustrating the configuration of a motion video encoding apparatus according to one embodiment.

FIG. 2 is a diagram schematically illustrating the configuration of the motion video encoding apparatus according to the one embodiment. The motion video encoding apparatus 10 includes an encode processing unit 11, a code amount control unit 12, a group determining unit 13, a group decode time information computing unit 14, a group information appending unit 15, and a bit counter 25. These units constituting the motion video encoding apparatus 10 are each implemented as a separate circuit on the motion video encoding apparatus 10. Alternatively, these units constituting the motion video encoding apparatus 10 may be implemented on the motion video encoding apparatus 10 in the form of a single integrated circuit on which the circuits implementing the functions of the respective units are integrated. Further, these units constituting the motion video encoding apparatus 10 may be implemented as functional modules by executing a computer program on a processor incorporated in the motion video encoding apparatus 10.

Each picture contained in motion video data to be encoded is divided into a plurality of blocks by a control unit not depicted, and supplies to the encode processing unit 11 on a block-by-block basis. Each block contains, for example, 16×16 pixels.

Each block is input to an orthogonal transform unit 21. The orthogonal transform unit 21 computes a set of frequency coefficients by applying an orthogonal transform such as a discrete cosine transform (DCT) to each block. The set of frequency coefficients thus computed is passed to a quantizing unit 22. When a predicted image is created for each block by motion compensation from a previously encoded picture, a prediction error image generated by computing the difference between the block and the predicted image may be input to the orthogonal transform unit 21.

The picture may be either a frame or a field. A frame refers to one complete still image in the motion video data, while a field refers to a still image obtained by extracting data only in the odd-numbered lines or even-numbered lines from the frame. Further, the encoded motion video can be color motion video or monochrome motion video.

The quantizing unit 22 quantizes each frequency coefficient by dividing the frequency coefficient by the quantization scale determined according to the quantization value computed by a quantization value computing unit 24 provided in the code amount control unit 12. With this quantization, the amount of information needed to represent each frequency coefficient is reduced. The larger the quantization value, the lower the quantization resolution, and the amount of information needed to represent each frequency coefficient becomes correspondingly smaller.

Each frequency coefficient quantized by the quantizing unit 22 is passed to a variable-length encoding unit 23. Each quantized frequency coefficient may be inverse-quantized in order to create a predicted image for a picture or a block to be subsequently encoded, and may further be inverse orthogonal-transformed and stored in an image memory not depicted.

The variable-length encoding unit 23 variable-length encodes the compressed data of the block (which includes the quantized frequency coefficients and block header information such as encoding mode information). Then, the variable-length encoding unit 23 assembles the bit sequence represented by the variable-length code into an output data stream.

Further, the number of bits in the bit sequence generated by the variable-length encoding unit 23 is added up by the bit counter 25 on a block-by-block basis, and the result is supplied as the amount of generated code to a buffer occupancy computing unit 26 provided in the code amount control unit 12. Detailed embodiments of the variable-length encoding unit 23 will be described later.

The group determining unit 13 determines the group to which the block being encoded belongs in accordance with a prescribed method based on block count information received from the control unit not depicted. The block count information is information that indicates the number assigned to each given block contained in the picture; for example, the number "1" is assigned to the block located in the upper left corner of the picture, and the subsequent blocks are numbered in sequence in a raster scan order. The largest number is assigned to the block located in the lower right corner of the picture. Alternatively, the block count information may include the number assigned to each given block in accordance with some other ordering scheme.

It is preferable that the group determining unit 13 determines a plurality of groups so that each group contains an equal number of blocks as far as possible in order to make the decode processing time substantially equal for all the groups. For example, if the blocks are grouped on a block line basis, the group determining unit 13 can make the number of blocks contained in each group equal for any given picture size. For example, when the picture size is 1920×1088 pixels corresponding to a high definition television (HDTV) picture, and the block size is 16×16 pixels, the number of block lines is 68. Accordingly, in this case, each given block contained in the picture being encoded is classified as belonging to one of the 68 groups. The number of blocks contained in each group may be any number between 1 and the total number of blocks contained in the entire picture.

The group determining unit 13 sends identification information identifying the group to which the block being encoded belongs to the buffer occupancy computing unit 26 in the code amount control unit 12. Further, the group determining unit 13 notifies the group decode time information computing unit 14 and the group information appending unit 15 of the total number N of groups. The group determining unit 13 may notify the group information appending unit 15 of the index of the block located at the head of each group.

A description will be given below by taking as an example the case in which the blocks are divided equally among N groups on a block line basis, where M denotes the number of blocks contained horizontally in the picture being encoded and N the number of blocks contained vertically therein.

Assuming that the picture being encoded is the i-th picture in the encoding order, the group decode time information computing unit 14 computes the decode time dgt(i,n), i.e., the time at which the n-th group is to be decoded, based on the decode time dt(i) $\{=t(i)+dly\}$ of the i-th picture which is later by a predetermined delay time dly than the input time t(i) of the i-th picture. Instead of dgt(i,n), the group decode time information computing unit 14 may compute $\{dgt(i, n)-dgt(i,n-1)\}$ as the decode time which is equivalent to dgt(i,n).

Further, the group decode time information computing unit 14 may round the decode time to an appropriate unit, for example, to a multiple of 1/90000 seconds.

The group decode time information computing unit 14 determines the decode time for each group, for example, by dividing the time needed to decode one picture equally among the number N of groups so that the time needed to decode each block becomes equal. In this case, the decode time of the n-th group (n=1, 2, . . . , N) is determined in accordance with the following equation.

$$dgt(i, n) = dt(i-1) + \{dt(i) - dt(i-1)\} \cdot n/N \qquad (1)$$

The decode processing time need not necessarily be made equal for each group. For example, in the case of the first group to be encoded and decoded, the group decode time information computing unit 14 may determine the decode time dgt(i,1) as indicated by the following equation, i.e., in such a manner that it is delayed relative to the decode time that would be determined by equally dividing the time needed to decode one picture.

$$dgt(i,1) \geq dt(i-1) + \{dt(i) - dt(i-1)\}/N \qquad (2)$$

where dt(i) and dt(i−1) are the decode times for the i-th and (i−1)th pictures, respectively.

Further, for each group that is subsequently encoded and decoded, the group decode time information computing unit 14 may determine the decode time dgt(i, n) (n≥2) as indicated by the following equation.

$$dgt(i, n) = dgt(i,1) + \{dt(i) - dgt(i,1)\} \cdot (n-1)/(N-1) \quad (n \geq 2) \qquad (3)$$

By thus determining the decode times, the group decode time information computing unit 14 can increase the buffer occupancy to be computed by the buffer occupancy computing unit 26 before starting the encoding of the first group. This provides greater freedom in code amount control. The group decode time information computing unit 14 passes the decode time information containing the decode time of each group to both the buffer occupancy computing unit 26 and the group information appending unit 15.

The buffer occupancy computing unit 26 computes an estimate of the buffer occupancy of the stream receive buffer in the idealized decoder. Let the transmission bit rate be denoted by R and the buffer occupancy by d. When the variable-length encoding of the current block is completed, the amount of the generated code, b, is reported from the bit counter 25 to the buffer occupancy computing unit 26. Then, the buffer occupancy computing unit 26 subtracts b from d.

After the last block in each group has been encoded, the buffer occupancy computing unit 26 restores the buffer occupancy, d, in accordance with the following equation.

$$d = d + (dgt(i, n+1) - dgt(i,n)) \cdot R \qquad (4)$$

Each time the variable-length encoding of one block is completed, the buffer occupancy computing unit 26 reports the computed buffer occupancy, d, to the quantization value computing unit 24.

Based on the buffer occupancy, the quantization value computing unit 24 computes the quantization value for that block. At this time, the quantization value computing unit 24 controls the quantization value for each block so that the total amount of code resulting from encoding all the blocks in the group does not exceed the buffer occupancy, d, computed just before starting the encoding of the first block in that group, i.e., the value of d does not become negative during the encoding process.

The quantization value computing unit 24 computes the quantization value in accordance, for example, with the quantization value computing method defined in MPEG-2 reference software, Test Model 5 (refer to non-patent document 1). Next, the quantization value computing unit 24 compares the buffer occupancy, d, with a predetermined threshold DTH1. When the quantization value is the maximum value it can take within a prescribed range, the threshold DTH1 is given by the following equation.

$$DTH1 = b0 \cdot M0 + \text{offset} \qquad (5)$$

where b0 is the maximum amount of code that can result from each block, and M0 is the number of blocks yet to be encoded in the group to which the block being encoded belongs. In equation (5), offset is a margin term. When d is compared with the threshold DTH1, if d is smaller than DTH1, the quantization value is set to the maximum value.

Alternatively, b0 may be made to represent the amount of code resulting from each block when all the frequency coefficients of that block are assumed to be zero. In this case, if d is smaller than DTH1, the quantization value computing unit 24 determines the quantization value so that all the frequency coefficients of the block being encoded are quantized to zero. By thus performing the control, the receive buffer in the hypothetical decoder does not underflow, as long as the average value of the amount of code resulting from the encoding of the blocks remaining to be encoded in the group does not exceed b0.

In this way, by actually transmitting the output stream from the motion video encoding apparatus at the prescribed rate R to the motion video decoding apparatus, the code amount control unit 12 can control the code amount of the motion video data so that the receive buffer in the motion video decoding apparatus does not underflow. The quantization value computing unit 24 passes the computed quantization value to the quantizing unit 22.

In order to share information concerning the group to which each block belongs and the decode time of each group with the motion video decoding apparatus, the motion video encoding apparatus 10 appends at least group information identifying the blocks belonging to each group and decode time information containing the decode time of each group to the data stream to be output. The motion video encoding apparatus 10 sends the group information and the decode time information to the motion video decoding apparatus. For the purpose, the group information appending unit 15 appends the group information to the header information of the output data stream, for example, for every picture or for every predetermined number of pictures.

The MPEG-2 Sequence Header or the H.264 Sequence Parameter Set or Supplemental Enhancement Information, for example, may be used as the header information. The decode time of each group may be appended to the header information, such as the MPEG-2 Picture Header or the H.264 Slice Header, that is invariably attached to each picture.

When the groups are determined so that each group contains an equal number of blocks, the motion video encoding apparatus 10 notifies the motion video decoding apparatus that all the blocks have been divided equally among the N groups. For this purpose, the group determining unit 13 sends information about the number of groups, N, as group information to the group information appending unit 15. The group information appending unit 15 encodes this group information. In MPEG-2 and H.264, encoding is performed on a block-by-block basis, called macroblocks each comprising 16×16 pixels, and usually the number of blocks does not exceed a range that can be expressed by 20 bits. Since the maximum number N of groups is at most equal to the maximum number of blocks, N may also be encoded with a fixed bit length.

On the other hand, when the number of blocks contained in each group is not always equal, the group determining unit 13 sends index information indicating the starting block in each group, along with the number of groups, N, as the group information to the group information appending unit 15. The group information appending unit 15 first encodes the number of groups, N, and then encodes the index information of the starting block in each group in sequence. A fixed bit length encoding scheme, for example, is also used to encode the index information of the starting block. Alternatively, the group information appending unit 15 may use other encoding schemes, for example, a variable-length encoding scheme such as Huffman encoding, to encode the number of groups, N, and the index information of the starting block in each group.

The group decode time information computing unit 14 notifies the group information appending unit 15 of the decode time computed for each group. In this case, the group decode time information computing unit 14 computes the decode time in the form of the difference value dgt(i,n)−dgt (i,n−1) for each of the N groups starting with the first group and ending with the last N-th group, and sends the thus computed decode time information to the group information appending unit 15. For the decode time of the first group, dgt(i,0) is set equal to the decode time dgt(i−1, N) {=dt(i−1)} of the last group in the immediately preceding picture. The group information appending unit 15 encodes the decode time of each group, and appends the encoded decode time to the current picture data which is sent to the motion video decoding apparatus. The group information appending unit 15 may first quantize each difference value with a suitable quantization resolution, for example, a resolution of 1/90000 seconds, and then encode it with a fixed bit length of 32 bits or so. While the above has described as an example of encoding using a fixed bit length, the group information appending unit 15 may encode the difference value representing the decode time of each group by using a suitable variable-length encoding scheme.

Based on the number of groups, N, and the decode time information computed for each group, the motion video decoding apparatus computes the amount of display delay. When the groups are determined so that each group contains an equal number of blocks, the amount of display delay is ct/N, where ct is the worst-case processing time needed to decode one picture.

Next, referring to FIGS. 3 and 4, a description will be given of how the motion video encoding apparatus 10 according to the above embodiment can reduce the delay that occurs when the motion video decoding apparatus decodes the motion video.

Figure 3:
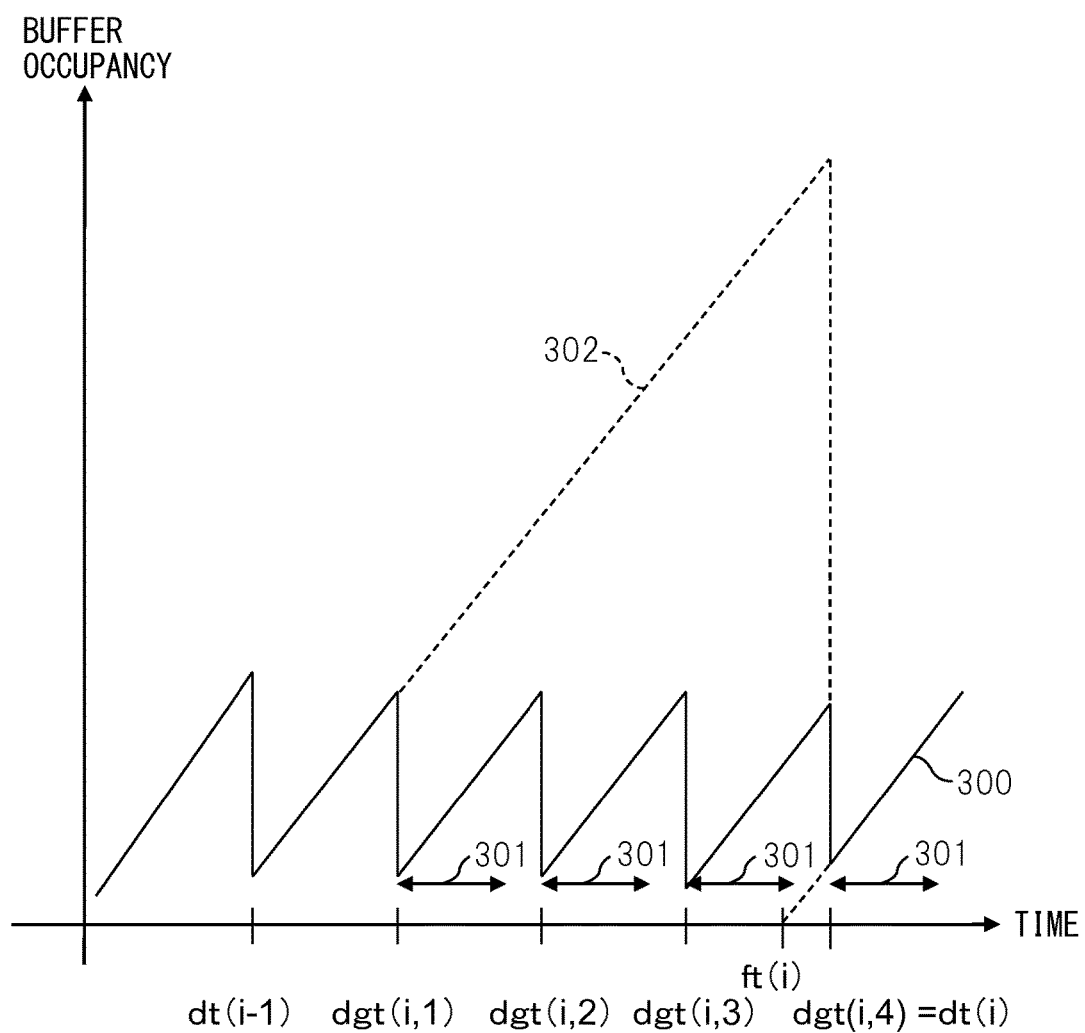
FIG. 3 is a diagram illustrating how the buffer occupancy of a receive buffer for storing an encoded motion video data stream received from the motion video encoding apparatus according to the one embodiment varies as a function of time.
Figure 4:
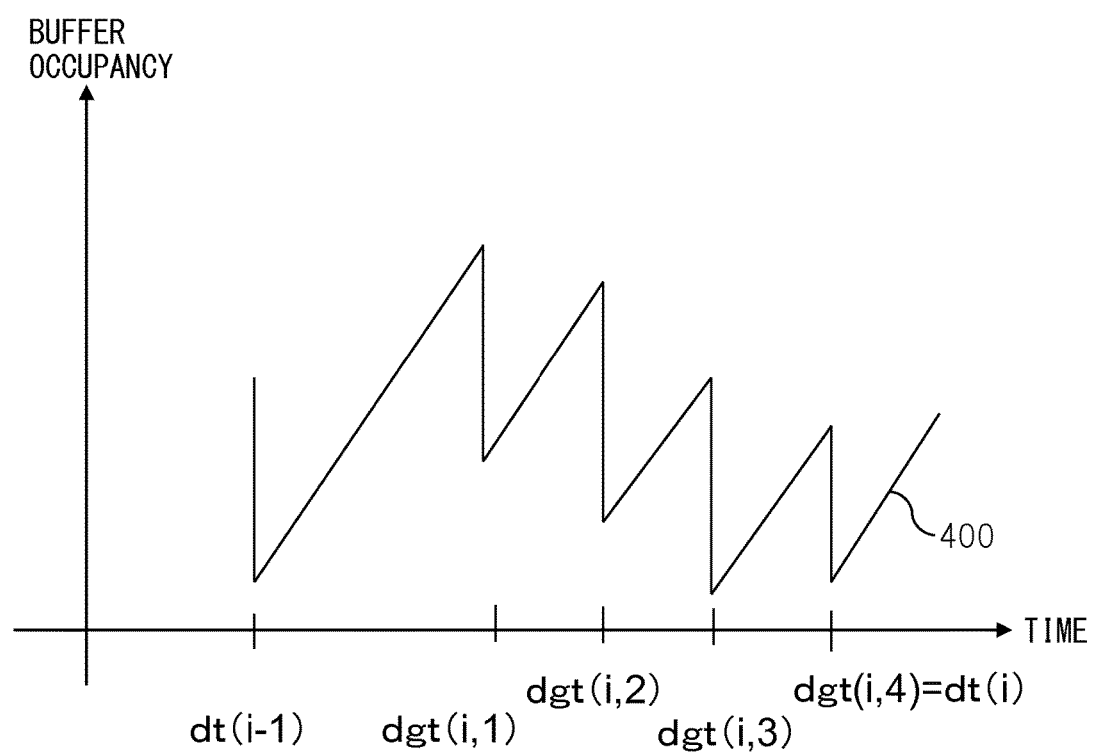
FIG. 4 is a diagram illustrating how the buffer occupancy of the receive buffer varies as a function of time when the decode time of the first group is delayed.

FIG. 3 is a diagram illustrating how the buffer occupancy of the receive buffer for storing the encoded motion video data stream received from the motion video encoding apparatus 10 varies as a function of time. FIG. 4 is a diagram illustrating how the buffer occupancy of the receive buffer varies as a function of time when the decode time of the first group is delayed. In FIGS. 3 and 4, the abscissa represents the time, and the ordinate represents the buffer occupancy. It is assumed that the number of groups, N, is 4. In FIG. 3, graph 300 depicts the variation of the buffer occupancy as a function of time. Each period indicated by arrow 301 represents the maximum time ct/N that may be needed to decode the corresponding group. Similarly, in FIG. 4, graph 400 depicts the variation of the buffer occupancy as a function of time.

The motion video encoding apparatus 10 controls the amount of code for each block so that the data needed for decoding the blocks contained in the n-th group will arrive at the receive buffer by the time dgt(i,n) given by the earlier stated equation (1). The following relation holds between the worst-case processing time ct needed to decode one picture and the decode time dt(i−1){=dgt(i−1,N)} of the (i−1)th picture and decode time dt(i){=dgt(i,N)} of the last group in the i-th picture.

$$ct \geq \{dt(i)-dt(i-1)\} \quad (6)$$

When each group contains an equal number of blocks, since the following relation holds as illustrated in FIG. 3, the decoding process for the blocks contained in the first to (N−1)th groups in the i-th picture will be completed by the decode time dgt(i,N) of the last group in the i-th picture.

$$dgt(i, n+1) \geq dgt(i,n)+ct/N \quad (7)$$

Suppose that the data needed for decoding the blocks contained in the N-th group arrives at the receive buffer in the motion video decoding apparatus at time dgt(i,N), whereupon the decoding of the N-th group is started; in this case, the processing time needed for decoding is ct/N. This means that the decoding of all the blocks will be completed at the time given by the following equation, thus making the picture ready for display. In this way, the display delay time relative to the idealized decoder is reduced from ct to ct/N.

$$dgt(i, N)+ct/N=dt(i)+ct/N \quad (8)$$

Figure 1:
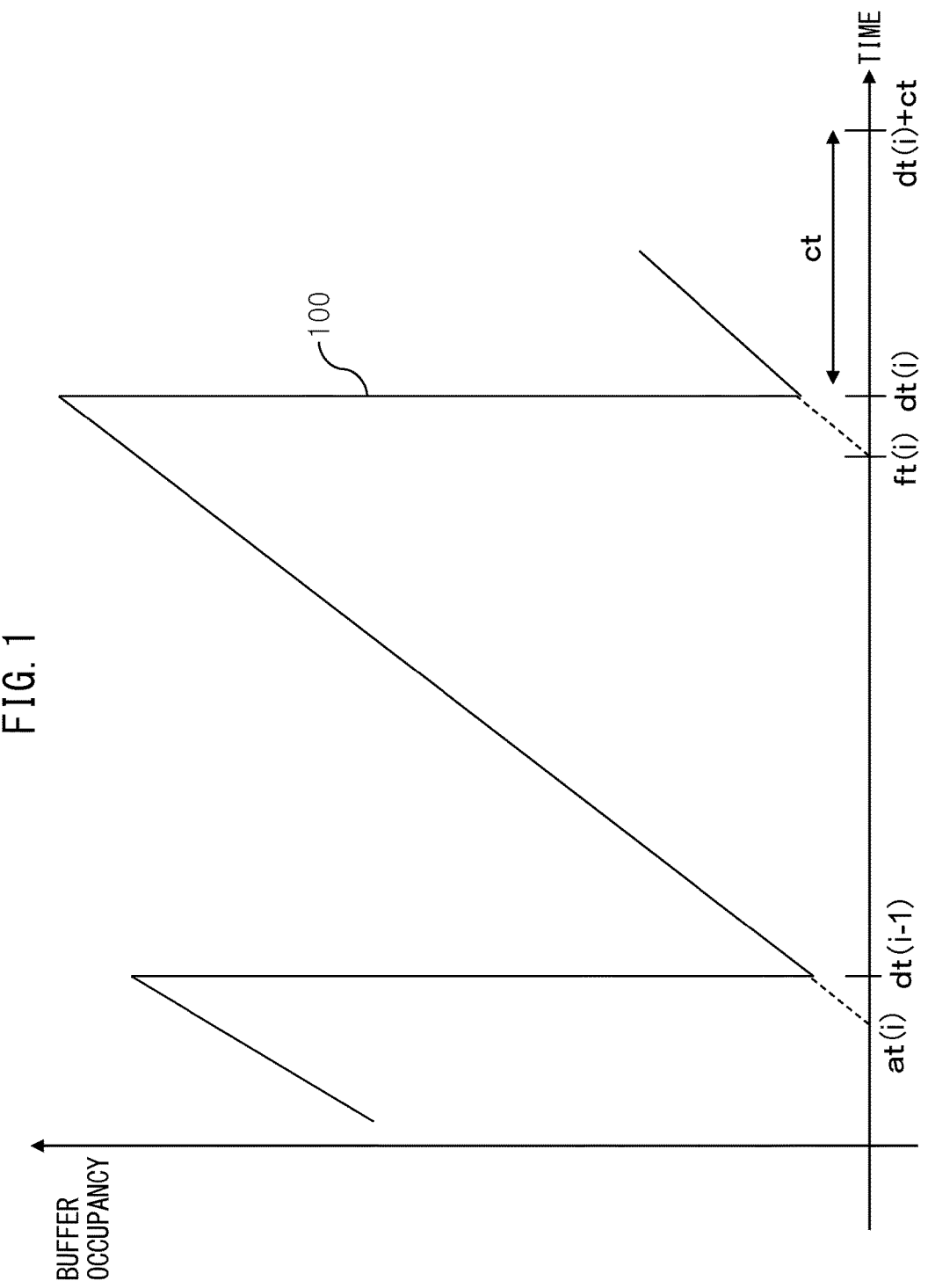
FIG. 1 is a diagram illustrating the buffer occupancy of a receive buffer according to the prior art as a function of time.

When the decode time is computed on a group-by-group basis, the decode time dgt(i,1) of the first group in the i-th picture becomes earlier by {dt(i)−dt(i−1)}(N−1)/N than the decode time dt(i) of the i-th picture. As a result, as can be seen from the per-picture buffer occupancy depicted in FIG. 1 and indicated by dashed line 302 in FIG. 3, the occupancy of the receive buffer is reduced compared with the prior art, and the amount of code usable for each group decreases, while at the same time, the degree of freedom in distributing the amount of code among the groups decreases. In the case of decoding each picture with a short delay approximately equal to the display period of one picture after the data of the picture has been input to the receive buffer, as illustrated in FIG. 1, the effects of reduced buffer occupancy become more pronounced since the buffer occupancy becomes smaller.

To avoid such a problem, it is preferable to delay the decode time of the first group, as indicated by the earlier given equation (2), for the purpose of restoring the buffer occupancy. By delaying the decode time of the first group, the number of bits that can be transmitted into the buffer increases, and the degree of freedom in controlling the amount of code generated for each picture can be increased. In this case, the latest decode completion time is given by the following equation.

$$\min(dgt(i,1)+ct,dt(i)+ct/N) \quad (9)$$

The function min(x,y) is a function that returns the value of the variable x or y, whichever is smaller.

As can be seen by comparing the equation (9) with the equation (8), if the decode time of the first group is delayed, the delay does not increase in the case of a motion video decoding apparatus in which ct is sufficiently short, while in the case of a motion video decoding apparatus in which ct is large, the delay becomes larger than when the decode time of the first group is not delayed.

Figure 5:
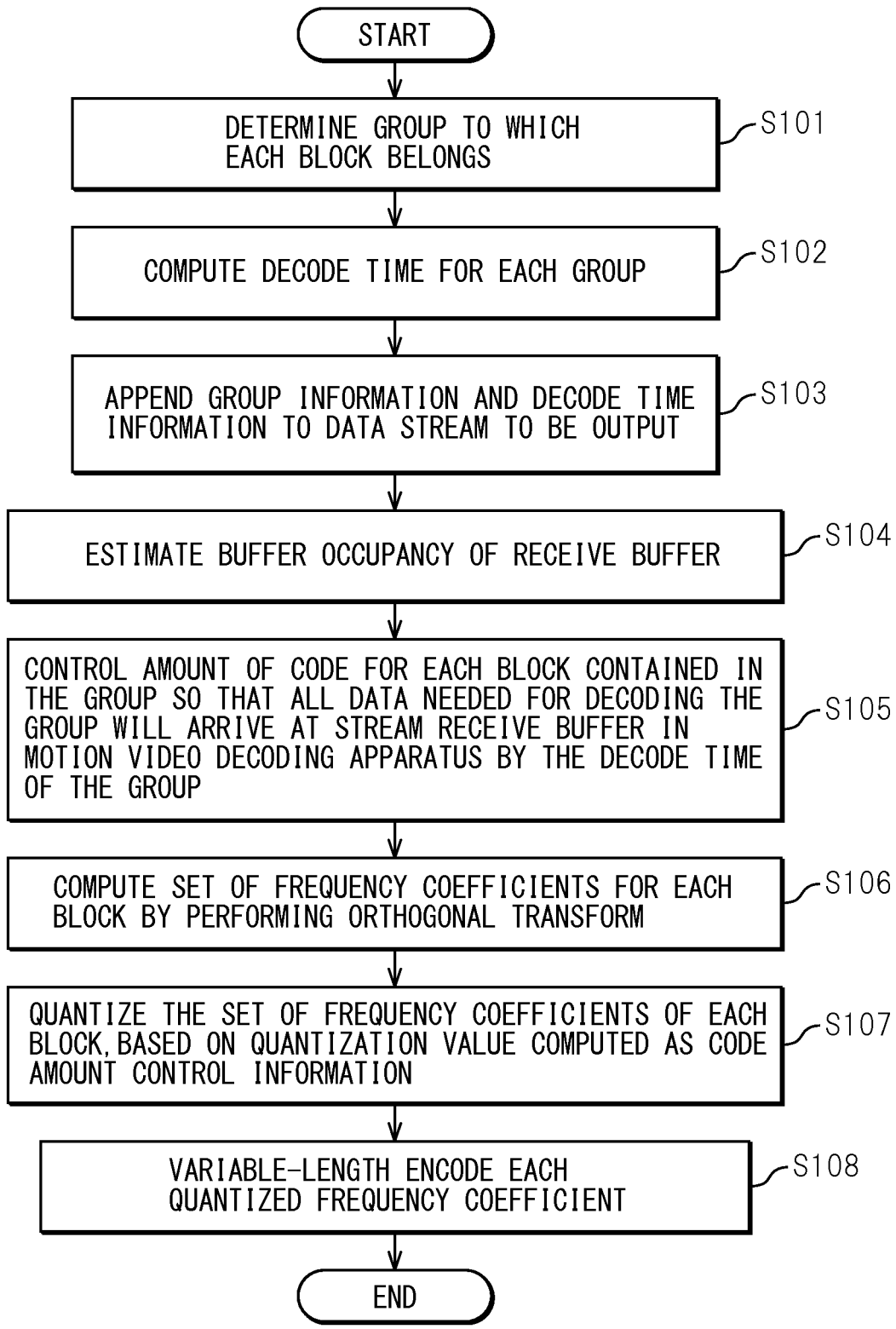
FIG. 5 is an operation flowchart of a motion video encoding process performed by the motion video encoding apparatus according to the one embodiment.

FIG. 5 is an operation flowchart of the motion video encoding process performed by the motion video encoding apparatus 10 according to the one embodiment. The motion video encoding apparatus 10 performs the following motion video encoding process on each picture.

The group determining unit 13 determines the group to which each block belongs (step S101). The group determining unit 13 sends identification information identifying the group to which the block belongs to the buffer occupancy computing unit 26 in the code amount control unit 12. Further, the group determining unit 13 notifies the group decode time information computing unit 14 and the group information appending unit 15 of the total number N of groups. The group determining unit 13 may notify the group information appending unit 15 of the index of the block located at the head of each group.

Next, the group decode time information computing unit 14 computes the decode time for each group (step S102). The group decode time information computing unit 14 passes information indicating the decode time of each group to the buffer occupancy computing unit 26 and the group information appending unit 15.

The group information appending unit 15 encodes the decode time information and the group information identifying the group to which each block belongs, and appends the encoded decode time information and group information to the data stream to be output (step S103).

On the other hand, the buffer occupancy computing unit 26 estimates the buffer occupancy that is expected for the receive buffer at the decode time of each group for the case where the data needed for decoding all the blocks contained in the group are transmitted to the motion video decoding apparatus at a predetermined transmission rate (step S104). For this purpose, the buffer occupancy computing unit 26 refers to the information received from the bit counter 25 representing the amount of code of the so far encoded blocks within the group. Then, the buffer occupancy computing unit 26 passes information representing the estimated buffer occupancy to the quantization value computing unit 24 in the code amount control unit 12. The quantization value computing unit 24 controls the amount of code for each block contained in the group so that all the data needed for decoding the group will arrive at the stream receive buffer in the motion video decoding apparatus by the decode time of that group (step S105). Then, the quantization value computing unit 24 computes code amount control information by computing the quantization value that matches the amount of code, and passes the thus computed quantization value to the quantizing unit 22 in the encode processing unit 11.

The orthogonal transform unit 21 in the encode processing unit 11 computes a set of frequency coefficients for each block by performing an orthogonal transform on each block (step S106). The orthogonal transform unit 21 passes the set of frequency coefficients of each block to the quantizing unit 22.

The quantizing unit 22 quantizes the set of frequency coefficients of each block, based on the quantization value computed as the code amount control information (step S107). The quantizing unit 22 passes each quantized frequency coefficient to the variable-length encoding unit 23 in the encode processing unit 11. The variable-length encoding unit 23 variable-length encodes each quantized frequency coefficient (step S108). The variable-length encoding unit 23 outputs the resulting variable-length code. This variable-length code is stored in the output data stream along with the group information, decode time information, etc., output from the group information appending unit 15. The variable-length encoding unit 23 supplies the amount of code for each block to the bit counter 25. After step S108, the motion video encoding apparatus 10 terminates the motion video encoding process.

A description of four embodiments of the variable-length encoding unit 23 and the definition of a group end bit according to each embodiment will be given below. The end bit of a group is defined as the end bit of the last block in the group.

The variable-length encoding unit 23 according to the first embodiment variable-length encodes compressed block data in compliance with Context-based Adaptive Variable Length Coding (CAVLC) defined in the MPEG-4 AVC/H.264.

Figure 6:
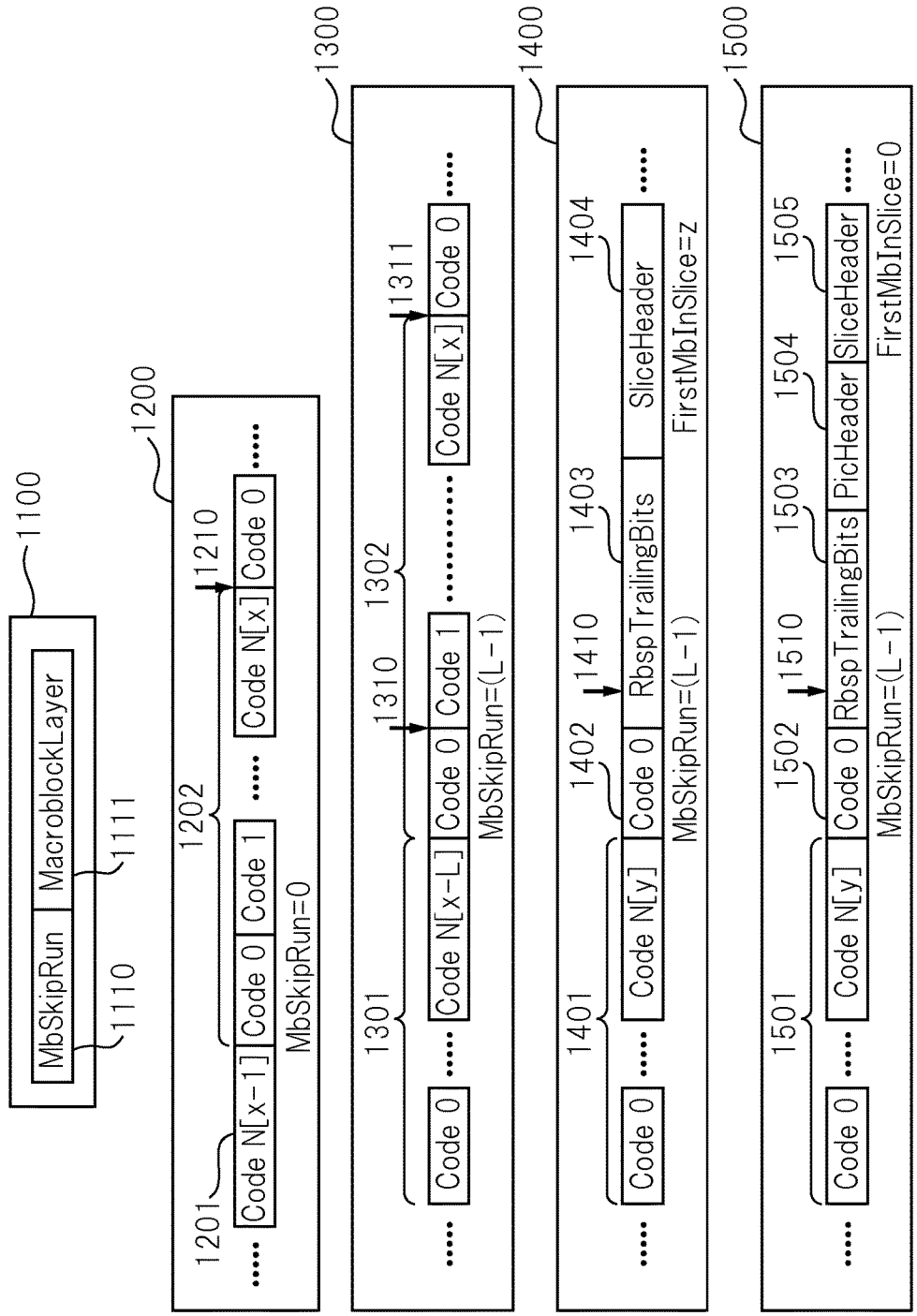
FIG. 6 is a diagram for explaining an end bit of each block according to a first embodiment.

FIG. 6 is a diagram for explaining the end bit of each block in the output data stream generated by the variable-length encoding unit 23 according to the first embodiment. In FIG. 6, the compressed data 1100 of one block depicted at the top of the figure can contain a macroblock skip run (hereinafter designated MbSkipRun) 1110 and a macroblock layer (hereinafter designated MacroblockLayer) 1111.

The MbSkipRun 1110 indicates the number of blocks skipped between the preceding block and the current block. Accordingly, when the MbSkipRun 1110 is 0, none of the blocks between the preceding block and the current block are skipped. On the other hand, the MacroblockLayer 1111 is block compressed data containing such information as the type of block encoding, motion vector information, and quantized DCT coefficients. A skipped block means that its MacroblockLayer 1111 is not included in the output data stream.

When the picture is an intra-coded picture, the MbSkipRun 1110 is always "0" because no block skipping is permitted. Therefore, in this case, the MbSkipRun 1110 is not included in the output data stream.

First, a description will be given for the case where the block for which the MbSkipRun 1110 is 0 (including any block contained in an intra-coded picture) is the last block in the group. In this case, a bit sequence 1200 in the output data stream contains a bit sequence 1202 concerning the compressed data of the last block x and a bit sequence 1201 for the blocks (up to (x−1)) preceding the last block x (x is an integer not smaller than 1).

The bit sequence 1202 is a bit sequence generated by variable-length encoding the MbSkipRun (=0) and MacroblockLayer of the last block x. In the bit sequence 1202, Code 0 is a bit sequence generated by variable-length encoding the MbSkipRun, and Code M (M=[1, N[x]) is a bit sequence generated by variable-length encoding each element of the MacroblockLayer. N[x] represents the number of elements contained in the MacroblockLayer of the last block x.

In the illustrated example, the end bit of the last block x is the end bit of the bit sequence Code N[x] which is indicated by arrow 1210.

Next, a description will be given of the end bit for the case where the MbSkipRun is (L−1) (where (L−1)>0) and where the MacroblockLayer of the succeeding block appears before the next picture header or slice header appears in the output data stream. In this case, a bit sequence 1300 in the output data stream contains a bit sequence 1301 concerning the block (x−L) immediately preceding the skipped block and a bit sequence 1302 concerning the block x immediately following the skipped block. The bit sequence 1301 is a bit sequence generated by variable-length encoding the MbSkipRun and MacroblockLayer of the block (x−L). Similarly, the bit sequence 1302 is a bit sequence generated by variable-length encoding the MbSkipRun and MacroblockLayer of the block x. Code 0 corresponding to the MbSkipRun contained in the bit sequence 1302 is a bit sequence generated by variable-length encoding the value (L−1).

In the illustrated example, there are (L−1) blocks (x−L+1) to (x−1), whose MacroblockLayer is not included in the output data stream, between the block (x−L) and the block x. Accordingly, when one of the blocks (x-L+1) to (x−1) is the last block, the end bit of such blocks is the end bit of the code Code 0 corresponding the MbSkipRun=(L−1) which is indicated by arrow 1310. When the block x is the last block, the end bit of the block x is the end bit of the Code N[x] contained in the bit sequence 1302 which is indicated by arrow 1311.

Next, a description will be given of the end bit for the case where the MbSkipRun is (L−1) (where (L−1)>0) and where the next slice header belonging to the same picture appears earlier than the MacroblockLayer of the succeeding block in the output data stream. In this case, a bit sequence 1400 in the output data stream contains a bit sequence 1401 concerning the block y immediately preceding the skipped block and a bit sequence 1402 generated by variable-length encoding the MbSkipRun corresponding to the block following the skipped block (y+1). The bit sequence 1401 is a bit sequence generated by variable-length encoding the MbSkipRun and MacroblockLayer of the block y. On the other hand, Code 0 contained in the bit sequence 1402 is a bit sequence generated by variable-length encoding the value (L−1).

The bit sequence 1400 further contains a bit sequence (hereinafter designated RbspTrailingBits) 1403 indicating the end of the slice and a slice header (hereinafter designated SliceHeader) 1404 which is a bit sequence indicating the start of the next slice.

The RbspTrailingBits 1403 is a bit sequence having a predetermined value that indicates the end of the bit sequence of the slice preceding the RbspTrailingBits. The RbspTrailingBits 1403 is set so that the motion video decoding apparatus can identify the end of the slice by referring at least to the first bit of the RbspTrailingBits 1403. The slice header 1404 contains a parameter FirstMbInSlice that indicates the starting block address of the slice. In the illustrated example, it is assumed that the parameter FirstMbInSlice is z.

In this case, there are (L−1) blocks (y+1) to (y+L−1 (=z−1)), whose MacroblockLayer is not included in the output data stream, between the block y and the starting block z of the next slice. Accordingly, when one of the blocks (y+1) to (y+L−1 (=z−1)) is the last block, the end bit of such blocks is the start bit of the bit sequence RbspTrailingBits 1403 which is indicated by arrow 1410. In this case, the end bit may be set at some other bit position in the bit sequence RbspTrailingBits 1403 than the start bit position.

Next, a description will be given of the end bit for the case where MbSkipRun is (L−1) (where (L−1)>0) and where a slice header or picture header belonging to another picture appears earlier than the MacroblockLayer of the succeeding block in the output data stream. In this case, a bit sequence 1500 in the output data stream contains a bit sequence 1501 concerning the block y immediately preceding the skipped block and a bit sequence 1502 generated by variable-length encoding the MbSkipRun corresponding to the block following the skipped block (y+1). The bit sequence 1501 is a bit sequence generated by variable-length encoding the MbSkipRun and MacroblockLayer of the block y. On the other hand, Code 0 contained in the bit sequence 1502 is a bit sequence generated by variable-length encoding the value (L−1).

The bit sequence 1500 further contains a bit sequence RbspTrailingBits 1503 indicating the end of the slice, a picture header 1504 indicating the start of the next picture, and a SliceHeader 1505 which is a bit sequence indicating the start of the next slice. In this case, since the starting block of the next slice is the starting block of the picture, the value of the parameter FirstMbInSlice contained in the SliceHeader 1505 is 0.

In the illustrated example, there are (L−1) blocks (y+1) to (y+L−1 (=w−1)), whose MacroblockLayer is not included in the output data stream, between the block y and the last block (w−1) of the picture, where w is the total number of blocks contained in the picture. Accordingly, when one of the blocks (y+1) to (y+L−1 (=w−1)) is the last block, the end bit of such blocks is the start bit of the bit sequence RbspTrailingBits 1503 which is indicated by arrow 1510. In this case, the end bit may be set at some other bit position in the bit sequence RbspTrailingBits 1503 than the start bit position.

Next, the variable-length encoding unit 23 according to the second embodiment will be described. The variable-length encoding unit 23 according to the second embodiment also variable-length encodes compressed block data in compliance with CAVLC defined in the MPEG-4 AVC/H.264. However, the second embodiment differs from the first embodiment in the compressed block data structure; more specifically, instead of the MbSkipRun that indicates the number of skipped blocks, the second embodiment uses a macroblock skip flag that indicates whether the current block is skipped or not. Further, the compressed data of each block is appended with a split flag that indicates whether the block is divided or not.

Figure 7:
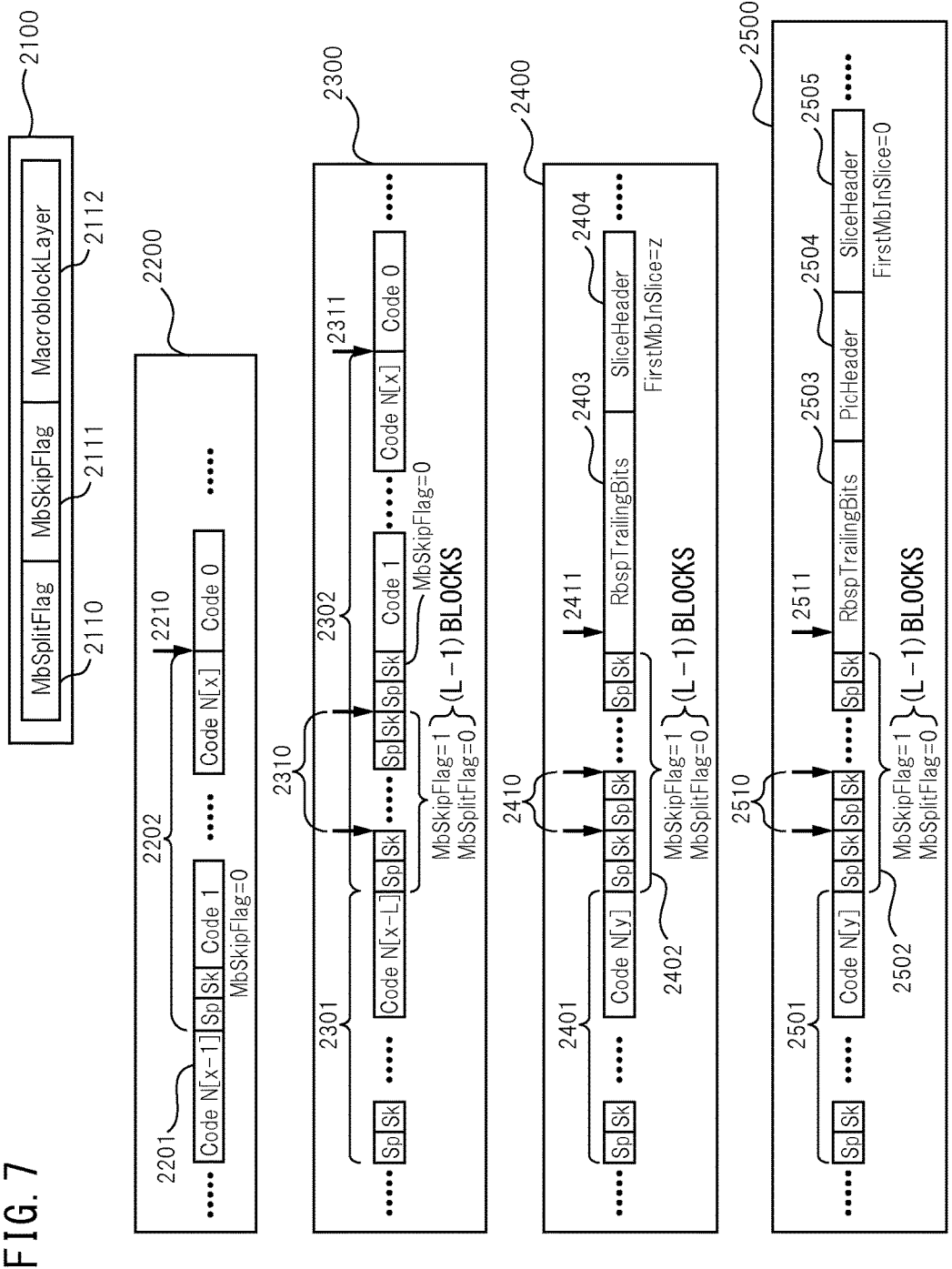
FIG. 7 is a diagram for explaining an end bit of each block according to a second embodiment.

FIG. 7 is a diagram for explaining the end bit of each block in the output data stream generated by the variable-length encoding unit 23 according to the second embodiment. In FIG. 7, the compressed data 2100 of one block can contain the split flag (hereinafter designated MbSplitFlag) 2110, the skip flag (hereinafter designated MbSkipFlag) 2111, and the MacroblockLayer 2112 in this order from the head of the block.

The MbSplitFlag 2110 indicates whether the current block (for example, a macroblock of 16×16 pixels) is divided into four sub-blocks (for example, blocks of 8×8 pixels). For example, when the current block is divided, the MbSplitFlag 2110 is set to "1"; on the other hand, when the current block is not divided or the current block is skipped, the MbSplitFlag 2110 is set to "0".

The MbSkipFlag 2111 indicates whether the current block is skipped or not. For example, when the current block is skipped, the MbSkipFlag 2111 is set to "1"; on the other hand, when the current block is not skipped, the MbSkipFlag 2111 is set to "0". The MacroblockLayer 2112 is block compressed data containing such information as the type of block encoding, motion vector information, and quantized DCT coefficients. A skipped block means that its MacroblockLayer 2112 is not included in the output data stream.

When the current block is divided, the MbSkipFlag 2111 is regarded as being set to "0", and therefore, the MbSkipFlag 2111 may be omitted from the output data stream. In this case, the compressed data of the four sub-blocks are stored in the output data stream, immediately following the MbSplitFlag 2110.

When the picture is an intra-coded picture, the MbSkipFlag 2111 is always "0" because no block skipping is permitted. Therefore, in this case, the MbSkipFlag 2111 is not included in the output data stream.

First, a description will be given for the case where the block for which the MbSkipFlag 2111 is 0 (including any block contained in an intra-coded picture) is the last block in the group. In this case, a bit sequence 2200 in the output data stream contains a bit sequence 2202 concerning the compressed data of the last block x and a bit sequence 2201 for the blocks (up to (x−1)) preceding the last block x (x is an integer not smaller than 1). Code 0 that follows the bit sequence 2202 indicates a bit sequence concerning the compressed data of the block (x+1).

The bit sequence 2202 is a bit sequence generated by variable-length encoding the MbSplitFlag (=0), MbSkipFlag (=0), and MacroblockLayer of the last block x. In the bit sequence 2202, Sp is a bit sequence generated by variable-length encoding the MbSplitFlag, and Sk a bit sequence generated by variable-length encoding the MbSkipFlag. Further, Code M (M=[1, N[x]) is a bit sequence generated by variable-length encoding each element of the MacroblockLayer. N[x] represents the number of elements contained in the MacroblockLayer of the last block x. In the illustrated example, the end bit of the last block x is the end bit of the bit sequence Code N[x] which is indicated by arrow 2210.

Next, a description will be given of the end bit for the case where a run of (L−1) blocks (where (L−1)>0) for which the value of MbSkipFlag is "1", i.e., skipped blocks, is followed by a block for which the value of MbSkipFlag is "0", i.e., a non-skipped block. A bit sequence 2300 in the output data stream contains a bit sequence 2301 concerning the compressed data of a non-skipped block (x−L). The bit sequence 2300 further contains, following the bit sequence 2301, a bit sequence 2302 concerning the MbSplitFlag (=0) and MbSkipFlag (=1) of each of the skipped blocks (x−L+1) to (x−1) and the compressed data of the succeeding block x. Code 0 that follows the bit sequence 2302 indicates a bit sequence concerning the compressed data of the block (x+1).

In the illustrated example, there are (L−1) blocks (x−L+1) to (x−1), whose MacroblockLayer is not included in the output data stream, between the block (x−L) and the block x. Accordingly, when one of the blocks (x−L+p) (p={1, ... , L−1}) is the last block, the end bit of such blocks is the end bit of the p-th code from the left among the (L−1) MbSkipFlag (=1) codes. When the block x is the last block, the end bit of the block x is the end bit of the Code N[x] contained in the bit sequence 2302 which is indicated by arrow 2311.

Next, a description will be given of the end bit for the case where a run of (L−1) blocks (where (L−1)>0) for which the value of MbSkipFlag is "1" is followed by the next slice header belonging to the same picture. In this case, a bit sequence 2400 in the output data stream contains a bit sequence 2401 concerning the compressed data of the block y that immediately precedes the run of skipped blocks. The bit sequence 2400 further contains, following the bit sequence 2401, a bit sequence 2402 generated by variable-length encoding the MbSplitFlag (=0) and MbSkipFlag (=1) of each of the skipped blocks starting with the block (y+1). The bit sequence 2401 is a bit sequence generated by variable-length encoding the MbSplitFlag (=0), MbSkipFlag (=0), and MacroblockLayer of the block y.

The bit sequence 2400 further contains a RbspTrailingBits 2403 indicating the end of the slice and a SliceHeader 2404 indicating the start of the next slice. The RbspTrailingBits 2403 is a bit sequence having a predetermined value that indicates the end of the bit sequence of the slice preceding the RbspTrailingBits. The RbspTrailingBits 2403 is set so that the motion video decoding apparatus can identify the end of the slice by referring at least to the first bit of the RbspTrailingBits 2403. The slice header 2404 contains a parameter FirstMbInSlice that indicates the starting block address of the slice. In the illustrated example, it is assumed that the parameter FirstMbInSlice is z.

In this case, there are (L−1) blocks (y+1) to (y+L−1 (=z−1)), whose MacroblockLayer is not included in the output data stream, between the block y and the starting block z of the next slice. Accordingly, when one of the blocks (y+p) (p={1, ... , L−2}) is the last block, the end bit of such blocks is the end bit of the p-th code from the left among the (L−2) MbSkipFlag (=1) codes. When the block (z−1) is the last block, the end bit is the start bit of the bit sequence RbspTrailingBits 2403 which is indicated by arrow 2411. In this case, the end bit may be set at some other bit position in the bit sequence RbspTrailingBits 2403 than the start bit position.

Next, a description will be given of the end bit for the case where a run of (L−1) blocks (where (L−1)>0) for which the value of MbSkipFlag is "1" is followed by a slice header or picture header belonging to another picture. In this case, a bit sequence 2500 in the output data stream contains a bit sequence 2501 concerning the compressed data of the block y that immediately precedes the run of skipped blocks. The bit sequence 2500 further contains, following the bit sequence 2501, a bit sequence 2502 generated by variable-length encoding the MbSplitFlag (=0) and MbSkipFlag (=1) of each of the skipped blocks starting with the block (y+1). The bit sequence 2501 is a bit sequence generated by variable-length encoding the MbSplitFlag (=0), MbSkipFlag (=0), and MacroblockLayer of the block y.

The bit sequence 2500 further contains a RbspTrailingBits 2503 indicating the end of the slice, a picture header 2504 indicating the start of the next picture, and a SliceHeader 2505 which is a bit sequence indicating the start of the next slice. In this case, since the starting block of the next slice is the starting block of the picture, the value of the parameter FirstMbInSlice contained in the SliceHeader 2505 is 0.

In the illustrated example, there are (L−1) blocks (y+1) to (y+L−1 (=w−1)), whose MacroblockLayer is not included in the output data stream, between the block y and the last block (w−1) of the picture, where w is the total number of blocks contained in the picture. Accordingly, when one of the blocks (y+p) (p={1, ... , L−2}) is the last block, the end bit of such blocks is the end bit of the p-th code from the left among the (L−2) MbSkipFlag (=1) codes. When the block (w−1) is the last block, the end bit is the start bit of the bit sequence RbspTrailingBits 2503 which is indicated by arrow 2511. In this case, the end bit may be set at some other bit position in the bit sequence RbspTrailingBits 2503 than the start bit position.

According to a modified example of the second embodiment, MbSplitFlag may be omitted. If MbSplitFlag is omitted, the end bit of the last block is determined in the same manner as described above with reference to FIG. 7.

Next, the variable-length encoding unit 23 according to the third embodiment will be described. The variable-length encoding unit 23 according to the third embodiment variable-length encodes compressed block data in compliance with Content-based Adaptive Binary Arithmetic Coding (CABAC) defined in the MPEG-4 AVC/H.264. CABAC is a form of arithmetic coding.

Figure 8A:
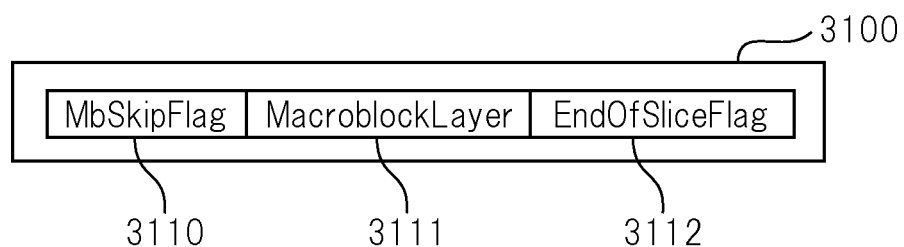
FIG. 8A is a diagram depicting the structure of compressed data of one block according to a third embodiment.

Next, referring to FIGS. 8A and 8B, an explanation will be given of the end bit of each block in the output data bitstream. FIG. 8A is a diagram depicting the structure of compressed data of one block. As depicted in FIG. 8A, the compressed data 3100 of one block can contain a MbSkipFlag 3110, a MacroblockLayer 3111, and a slice end flag (hereinafter designated EndOfSliceFlag) 3112 in this order from the head of the block.

The MbSkipFlag 3110 indicates whether the current block is skipped or not. For example, when the current block is skipped, the MbSkipFlag 3110 is set to "1"; on the other hand, when the current block is not skipped, the MbSkipFlag 3110 is set to "0". The MacroblockLayer 3111 is block compressed data containing such information as the type of block encoding, motion vector information, and quantized DCT coefficients. A skipped block means that its MacroblockLayer 3111 is not included in the output data stream.

When the picture is an intra-coded picture, the MbSkipFlag 3110 is always "0" because no block skipping is permitted. Therefore, in this case, the MbSkipFlag 3110 is not included in the output data stream.

The EndOfSliceFlag 3112 indicates whether the current block is the last block of the slice. For example, when the current block is the last block of the slice, the EndOfSliceFlag 3112 is set to "1"; on the other hand, when the current block is not the last block, the EndOfSliceFlag 3112 is set to "0".

Figure 8B:
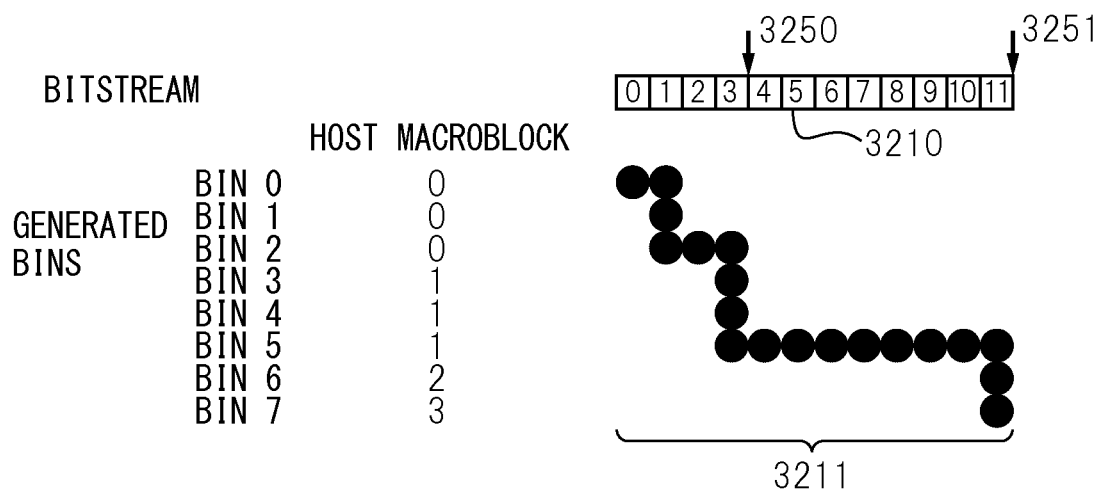
FIG. 8B is a diagram for explaining the relationship between the compressed data and a bit sequence converted by variable-length encoding.

FIG. 8B is a diagram for explaining the relationship between the compressed data and the bit sequence converted by variable-length encoding. Unlike CAVLC, CABAC applies arithmetic coding to each bit of the compressed data. Accordingly, the bits in the converted bit sequence do not correspond one for one with the bits in the compressed data before the conversion. One bit in the converted bit sequence may correspond to more than one bit in the compressed data.

As illustrated in FIG. 8B, a bit sequence 3210 as one example of the bit sequence in the output data stream contains 12 bits. In this case, a set of dots 3211 represents bins contained in the compressed data that correspond to the respective bits in the bit sequence 3210 and that are obtained by arithmetic-decoding the bit sequence 3210. The bins are binary representations of the compressed data, and each represents a bit or a bit sequence in the compressed data that corresponds to a codeword. In the illustrated example, the bit sequence 3210 corresponds with bins 0 to 7. Bins 0 to 2 are contained in block 0, bins 3 to 5 are contained in block 1, bin 6 is contained in block 2, and bin 7 is contained in block 3. Each given dot in the set of dots 3211 indicates that the bit contained in the converted bit sequence 3210 and located directly above that given dot is used to decode the bin located to the left of that given dot. For example, bin 0 is decoded by using the zeroth and first bits. Likewise, bin 1 is decoded by using the first bit. On the other hand, bin 5 is decoded using the third to 11th bits.

The end bit of each block encoded by CABAC is the last bit in the bit sequence used to decode bin x contained in the compressed data of that block. Bin x here corresponds to the last bit when the compressed data of the block is binarized in sequence. In the example illustrated in FIG. 8B, the end bit of block 0 is the third bit in the bit sequence 3210 which is indicated by arrow 3250. On the other hand, the end bit of each of blocks 1 to 3 is the 11th bit in the bit sequence 3210 which is indicated by arrow 3251. In this way, a plurality of blocks can share the same end bit.

When each block is encoded by CABAC, the end bit of the binarized version of the compressed data of the block is invariably an EndOfSliceFlag. When the picture contains w blocks, the output data stream invariably contains w MbSkipFlags and w EndOfSliceFlags. As a result, the end bit of the x-th block in the picture is the last bit in the bit sequence that is used to decode the x-th EndOfSliceFlag.

Figure 9A:
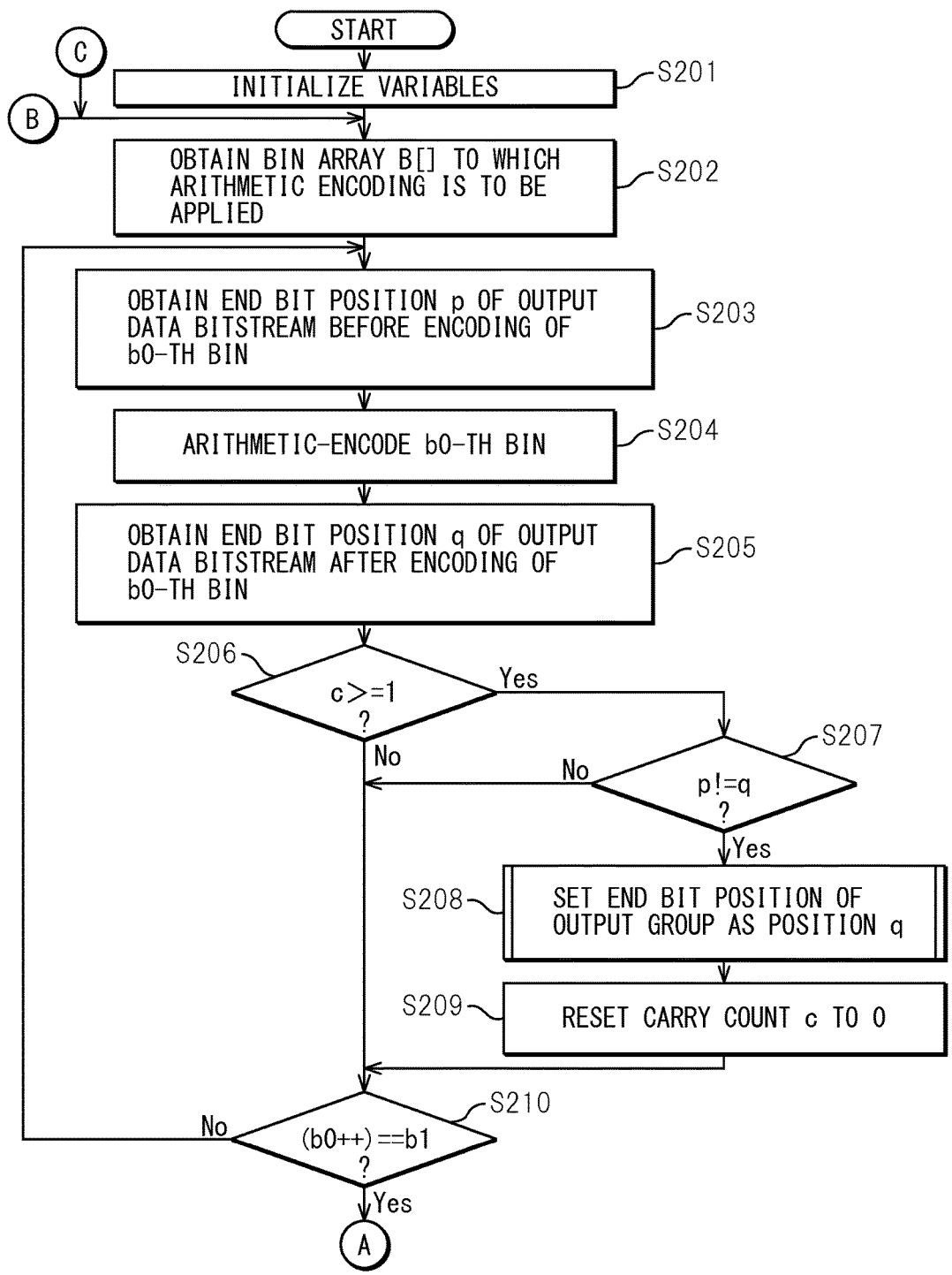
FIGS. 9A to 9C are a flowchart for deriving the end bit position of a block variable-length encoded by a variable-length encoding unit according to the third embodiment.
Figure 9B:
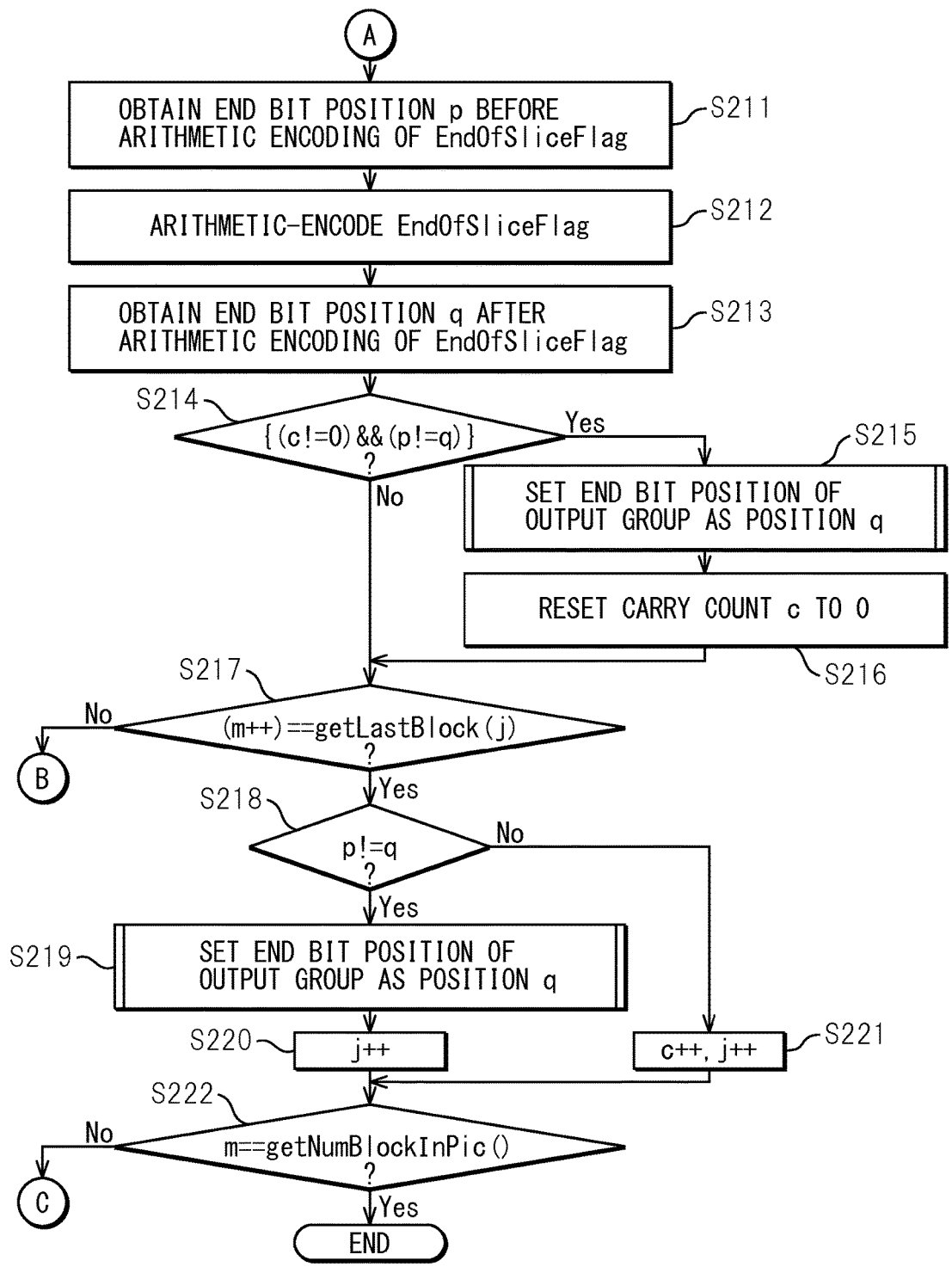
Figure 9C:
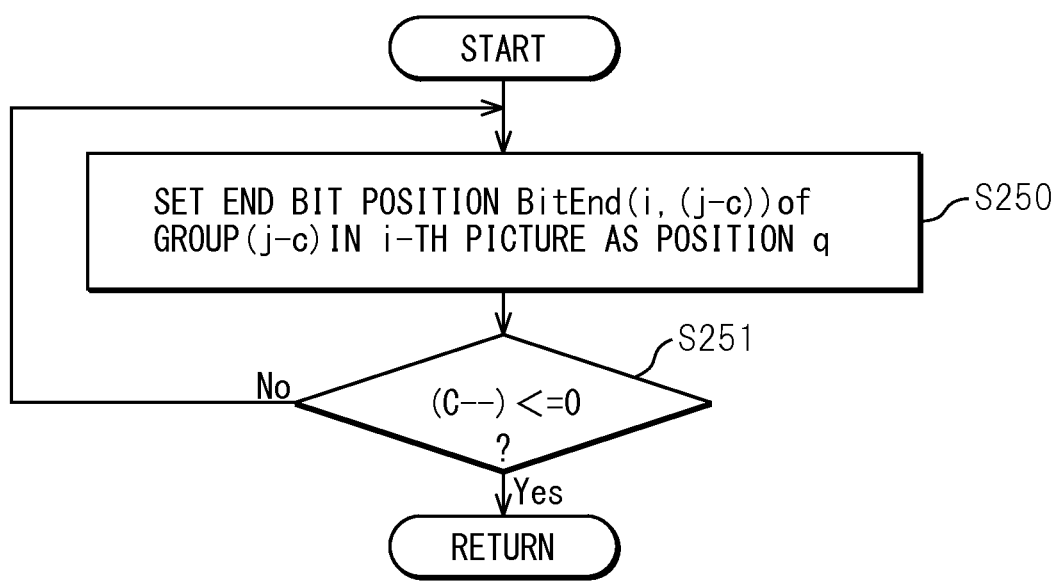

FIGS. 9A to 9C are a flowchart illustrating the process for identifying the end bit of each given group in the output data bitstream according to the third embodiment. The variable-length encoding unit 23 in the motion video encoding apparatus derives, in accordance with the following flowchart, the position BitEnd(i,j) of the end bit of the last block belonging to the j-th group G(i,j) in the i-th picture in the output data bitstream. When the bit corresponding to the position BitEnd(i,j) is input to the transmit buffer in the motion video encoding apparatus 10, the motion video encoding apparatus 10 determines that all the bits needed for decoding the group G(i,j) have been input to the transmit buffer in the motion video encoding apparatus 10.

The flowchart is started immediately after the header (picture header and slice header) of the i-th picture has been encoded. First, the variable-length encoding unit 23 initializes variables j, m, and c (step S201). The variables j, m, and c represent the index of a given group in the picture, the index of a given block in the picture, and a carry count. The carry count c will be described later.

Next, by performing compression of the block of index m and binarization and context modeling of the compressed data, the variable-length encoding unit 23 obtains a bin array B[ ] to which arithmetic encoding (corresponding to EncodingDecision( ) defined in the MPEG-4 AVC/H.264) is to be applied (step S202). The compression here is a process for removing EndOfSliceFlag that indicates whether the block is the last block in the slice. The total number of bins in the block m to which the arithmetic encoding is to be applied is expressed as getNumBins(m). The variable-length encoding unit 23 sets the index b0 of the target bin to 0 and the index b1 of the last bin in the block m to getNumBins (m).

The variable-length encoding unit 23 obtains the end bit position p of the bitstream before the arithmetic encoding of the b0-th bin (step S203). Then, the variable-length encoding unit 23 arithmetic-encodes the b0-th bin (step S204). As a result, a newly generated bit, for example, between 0 to 7 bits, is added at the end of the bitstream. Then, the variable-length encoding unit 23 obtains the end bit position q of the bitstream after the arithmetic encoding of the b0-th bin (step S205).

After step S205, the variable-length encoding unit 23 determines whether or not the carry count c is 1 or larger (step S206). The carry count c is a count that increments by 1 when a new bit has not been added to the bitstream after arithmetic-encoding the EndOfSliceFlag of the last block in a given group. That is, when the carry count c is 1 or larger, the carry count c indicates that all the bits needed for decoding the group x (x=j−1, . . . , j−c) have not been output in the bitstream.

If the carry count c is 1 or larger (Yes in step S206), the variable-length encoding unit 23 compares the end bit position p of the bitstream before the arithmetic encoding of the b0-th bin with the end bit position q of the bitstream after the arithmetic encoding of the b0-th bin (step S207).

If the bit position p is different from the bit position q (Yes in step S207), this means that a new bit is generated by arithmetic-encoding the b0-th bin. In this case, the b0-th bin and the bit corresponding to the EndOfSliceFlag of the last block in the group x (x=j−1, . . . , j−c) that was previously arithmetic-encoded but not output in the bitstream are output in the bitstream. That is, all the bits needed for decoding the group x have been output at position q. Then, the variable-length encoding unit 23 sets, as the bit position q, the end bit position BitEnd( ) of the bit sequence needed for decoding the group that has been output here (step S208). The details of the processing in step S208 will be described later.

All the bits needed for decoding every group whose index is smaller than j have now been output in the bitstream. Therefore, the variable-length encoding unit 23 resets the carry count c to 0 (step S209).

After step S209, the variable-length encoding unit 23 determines whether all the bins in the bin array B[ ] to be arithmetic-encoded have been processed, that is, whether b0 is equal to b1 (step S210). If b0 is less than b1 (No in step S210), the variable-length encoding unit 23 increments b0 by 1, and repeats the process from step S203 onward. The variable-length encoding unit 23 thus performs processing on any bin remaining in the bin array B[ ]. On the other hand, if b0 is equal to b1 (Yes in step S201), the variable-length encoding unit 23 increments b0 by 1, and proceeds to step S211. After comparison with b1, b0 is incremented by 1, whether it be less than or equal to b1, but when b0 is equal to b1, b0 is subsequently reset to 0 in step S202.

On the other hand, if the carry count c is 0 in step S206 (No in step S206), the variable-length encoding unit 23 proceeds directly to step S210 without processing steps S208 to S209. Further, if the bit position p is the same as the bit position q in step S207 (No in step S207), no new bit is generated by arithmetic-encoding the b0-th bin. In this case also, the variable-length encoding unit 23 proceeds to step S210 without processing steps S208 and S209.

As illustrated in FIG. 9B, the variable-length encoding unit 23 obtains the end bit position p of the bitstream before the arithmetic encoding of EndOfSliceFlag (step S211). Then, the variable-length encoding unit 23 arithmetic-encodes EndOfSliceFlag (step S212), and obtains the end bit position q of the bitstream after the arithmetic encoding of EndOfSliceFlag (step S213).

The variable-length encoding unit 23 determines whether or not the carry count c is 1 or larger and whether the end bit position p of the bitstream before the arithmetic encoding of EndOfSliceFlag is different from the end bit position q of the bitstream after the arithmetic encoding of EndOfSliceFlag (step S214). If the carry count c is 1 or larger, and if the end bit position p is different from the end bit position q (Yes in step S214), this means that the EndOfSliceFlag of the last block in the group x (x=j−1, . . . , j−c) is output in the bitstream. In other words, all the bits needed for decoding the group x have been output in the bitstream. Then, the variable-length encoding unit 23 sets, as the bit position q, the end bit position BitEnd( ) of the bit sequence needed for decoding the group that has been output here (step S215), and thereafter resets the carry count c to 0 (step S216).

After step S216, or after it is determined in step S214 that the carry count c is 0 or the end bit position p is the same as the end bit position q (No in step S214), the variable-length encoding unit 23 proceeds to determine whether the current block m is the last block in the group j (step S217). GetLastBlock(j) represents the index of the last block in the group j. If the current block m is not the last block in the group j (No in step S217), this means that there remain one or more blocks to be processed in the group j. Then, the variable-length encoding unit 23 increments m by 1 and repeats the process from step S202 onward.

On the other hand, if the current block m is the last block in the group j (Yes in step S217), the variable-length encoding unit 23 increments m by 1. Then, the variable-length encoding unit 23 compares the end bit position p of the bitstream before the arithmetic encoding of EndOfSliceFlag with the end bit position q of the bitstream after the arithmetic encoding of EndOfSliceFlag (step S218).

If the end bit position p is different from the end bit position q (Yes in step S218), this means that a new bit is generated by arithmetic-encoding the EndOfSliceFlag. This therefore means that all the bits needed for decoding the last block in the group j have been output in the bitstream. Then, the variable-length encoding unit 23 sets, as the bit position q, the end bit position BitEnd( ) of the bit sequence needed for decoding the group j that has been output (step S219), and increments the index j of the group by 1 (step S220).

On the other hand, if the end bit position p is the same as the end bit position q (No in step S218), no new bit is generated by arithmetic-encoding the EndOfSliceFlag. Accordingly, the variable-length encoding unit 23 increments the carry count c by 1 and also increments the group index j by 1 (step S221).

After step S220 or S221, the variable-length encoding unit 23 determines whether the current block m is the last block in the picture (step S222). GetNumBlockInPic( ) represents the total number of blocks in the picture.

If the current block m is not the last block in the picture (No in step S222), this means that there remain one or more blocks to be processed in the picture, and the variable-length encoding unit 23 repeats the process from step S202 onward. On the other hand, if the current block m is the last block in the picture (Yes in step S222), the variable-length encoding unit 23 terminates the end bit identification process by determining that the encoding of all the blocks in the picture has been completed.

The flow of the end bit position setting process performed in steps S208, S215, and S219 will be described below with reference to FIG. 9C.

The variable-length encoding unit 23 sets, as the position q, the end bit position BitEnd(i,(j−c)) of the bit sequence needed for decoding the (j−c)th group in the i-th picture (step S250). After that, the variable-length encoding unit 23 determines whether or not the carry count c is 0 or less (step S251). If the carry count c is larger than 0 (No in step S251), this means that there remains a group for which the end bit position BitEnd( ) has yet to be set. Then, the variable-length encoding unit 23 decrements the carry count by 1, and thereafter carries out the step S250 once again. On the other hand, if the carry count c is 0 or less (Yes in step S251), there remains no longer any group for which the end bit position BitEnd( ) has yet to be set. Therefore, the variable-length encoding unit 23 terminates the end bit position setting process.

Next, the variable-length encoding unit 23 according to the fourth embodiment will be described. The variable-length encoding unit 23 according to the fourth embodiment variable-length encodes compressed block data in accordance with the method disclosed in non-patent document 2 (JCTVC-A116, "Description of video coding technology proposal by Fraunhofer HHI," Joint Collaborative Team on Video Coding of ITU-T SG16 WP3 and ISO/IEC JTC1/SC29/WG11, April 2010).

The method disclosed in non-patent document 2 basically uses arithmetic coding technology as CABAC does. The disclosed method, however, uses a plurality of arithmetic encoders based on the estimated probabilities of the individual bits in binarized compressed data, rather than arithmetic-encoding the binarized compressed data on a bit-by-bit basis. Each arithmetic encoder is assigned a different estimated probability, and each bit in the binarized compressed data is arithmetic-encoded by the arithmetic encoder corresponding to its estimated probability.

According to this method, in order to process a bit sequence of a fixed estimated probability, each arithmetic encoder may variable-length encode the compressed data by mapping n input bits into m output bits, rather than actually performing arithmetic encoding operations. Here, m and n are each an integer not smaller than 1. For convenience, in the present specification, the output m bits is referred to as a word. The variable-length encoded compressed data is output in the output data bitstream on a word-by-word basis.

In the method disclosed in non-patent document 2, as in CABAC, the bits in the converted bit sequence do not correspond one for one with the bits in the compressed data before the conversion. Further, a word corresponding to a bin that was input to the arithmetic encoder at an earlier time may appear in the output data bitstream at a position later than a word corresponding to a bin that was input to the arithmetic encoder at a later time.

Figure 10:
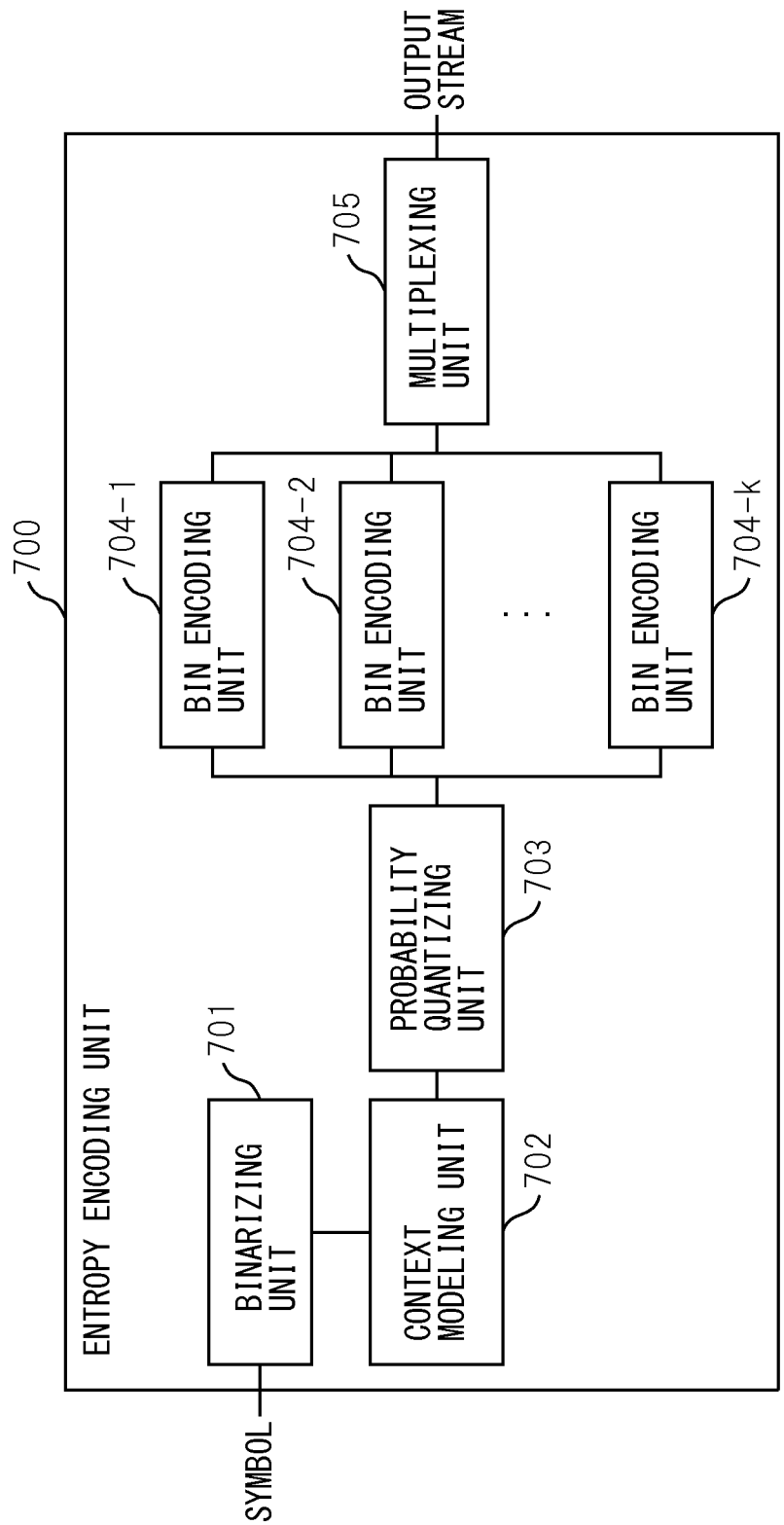
FIG. 10 is a diagram schematically illustrating the configuration of an entropy encoding unit provided in a variable-length encoding unit according to a fourth embodiment.

FIG. 10 is a diagram schematically illustrating the configuration of an entropy encoding unit 700 provided in the variable-length encoding unit 23 according to the fourth embodiment. The entropy encoding unit 700 entropy-encodes the compressed data of the input block, and outputs the resulting stream. For this purpose, the entropy encoding unit 700 includes a binarizing unit 701, a context modeling unit 702, a probability quantizing unit 703, a number, K, of bin encoding units 704-1 to 704-K (where K is an integer not smaller than 2), and a multiplexing unit 705.

The binarizing unit 701 binarizes each symbol contained in the compressed data of the input block, and expresses each symbol by a bit sequence. For this purpose, the binarizing unit 701 binarizes each symbol in compliance, for example, with the MPEG-4 AVC/H.264. When the macroblock type mType in an I-slice is a symbol "INxN" that indicates a 4×4 intra-prediction or an 8×8 intra-prediction, for example, the symbol is expressed by "0". On the other hand, when the macroblock type mType is a symbol "IPCM" that indicates PCM coding, the symbol is expressed by "11". The bit sequence output from the binarizing unit 701 is input to the context modeling unit 702.

The context modeling unit 702 assigns a context to each individual bit in the bit sequence input from the binarizing unit 701. The context is determined, for example, based on the compressed data of blocks in the neighborhood. By using a different context when the compressed data of the block to be entropy-encoded is similar to the compressed data of its neighboring blocks than when it is not similar, the efficiency of the arithmetic coding improves. For each bit in the bit sequence, the context modeling unit 702 outputs its value (0 or 1), the least probable bit (LPB) of the assigned context, and the LPB probability, and the thus output bit, LPB, and LPB probability are input to the probability quantizing unit 703. The LPB represents a value whose frequency of occurrence is smaller among the bits in the bit sequence that have previously been output by being paired with that context. The LPB probability is the probability of occurrence of LPB. For example, suppose that the 10 bits contained in the previously output bit sequence are [0, 0, 0, 1, 1, 1, 1, 1, 1, 1]; then, the LPB is 0, and the LPB probability is 0.3.

The probability quantizing unit 703 quantizes the LPB probability of each bit output from the context modeling unit 702. For example, the probability quantizing unit 703 quantizes the probability value continuous from 0 to 1 into a set of K discrete values. For example, when the LPB probability is 0.3, and K is 4, the probability quantizing unit 703 quantizes the LPB probability value of 0.3 to 0.25 (=1/4). Each bit output from the probability quantizing unit 703 is input to one of the K bin encoding units 704-1 to 704-K that corresponds to the quantized value of the LPB probability of that bit.

The bin encoding units 704-1 to 704-K arithmetic-encode the bits corresponding to the quantized values of respectively different LPB probabilities. For example, when the quantized value of the LPB probability is 1/4, as described above, the bit corresponding to that LPB probability is input to one of the bin encoding units 704-1 to 704-K that corresponds to the discrete probability value of 1/4. Then, the bin encoding unit adds the bit to the bit sequence stored at an entry of quantized LPB probability associated with that bit encoding unit among the bit sequences stored at respectively designated entries in a buffer maintained in the multiplexing unit 705. The bin encoding unit converts the bit sequence to a word each time the bit sequence becomes ready for conversion.

The multiplexing unit 705 has, for example, a buffer and stores in the buffer the bit sequence written by each bin encoding unit and the word corresponding to that bit sequence. The multiplexing unit 705 holds the word in the buffer until the word becomes ready for output. When the word becomes ready for output, the multiplexing unit 705 outputs the word as an output data bitstream.

Since it can be assumed that each bit input to the same bin encoding unit has the same LPB, each bin encoding unit and the multiplexing unit may variable-length encode the bit sequence of the plurality of input bits as one bin sequence, rather than arithmetic-encoding each individual bit. In that case, a mapping table that provides a mapping of bit sequences (bin sequences) to words is stored in each bin encoding unit. Then, by referring to the mapping table, the bin encoding unit converts the bin sequence to the corresponding word. For example, when the LPB is "1", and the LPB probability is 0.15 (i.e., the probability of occurrence of "0" is 0.85), the input bin sequence "0000" is converted to "1", and the input bin sequence "11" to "00001".

Figure 11:
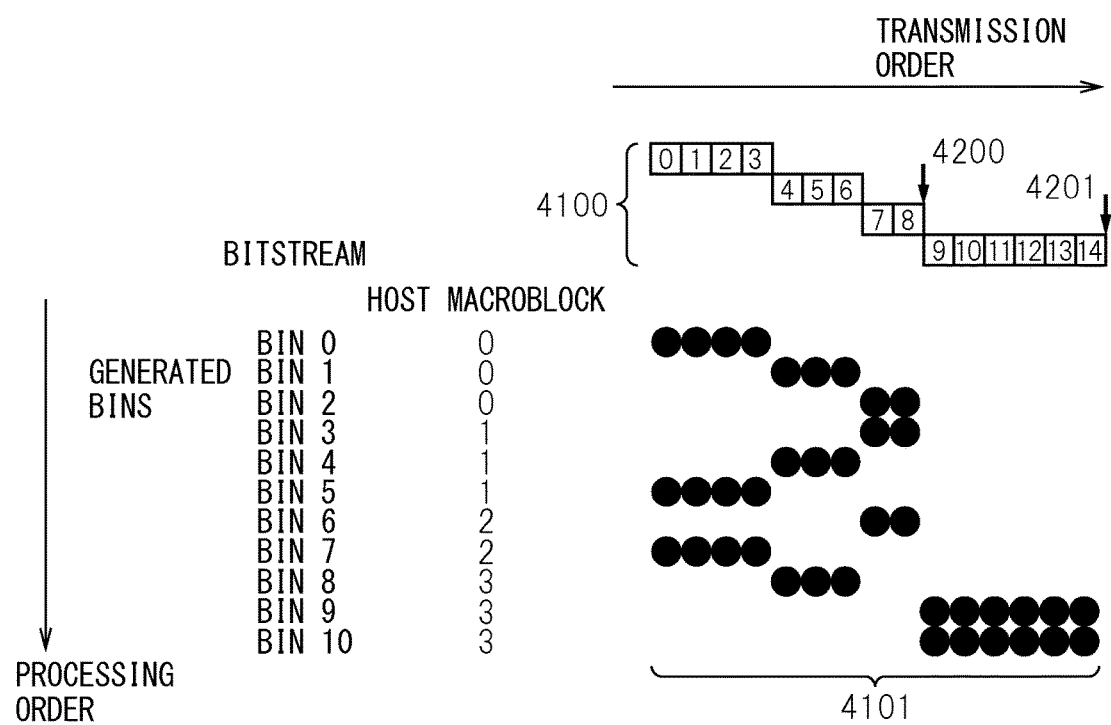
FIG. 11 is a diagram for explaining an end bit of each block according to the fourth embodiment.

Next, referring to FIG. 11, an explanation will be given of the end bit of each block in the output data bitstream. FIG. 11 is a diagram for explaining the relationship between the compressed data and the bit sequence converted by variable-length encoding. The structure of the compressed data of the block is the same as that depicted in FIG. 8A.

As illustrated in FIG. 9, a bit sequence 4100 as one example of the bit sequence in the output data stream contains 15 bits. In this case, a set of dots 4101 represents bins contained in the compressed data that correspond to the respective bits in the bit sequence 4100 and that are obtained by arithmetic-decoding the bit sequence 4100. In the illustrated example, the bit sequence 4100 corresponds with bins 0 to 10. Bins 0 to 2 are contained in block 0, bins 3 to 5 are contained in block 1, bins 6 and 7 are contained in block 2, and bins 8 to 10 are contained in block 3. Each given dot in the set of dots 4101 indicates that the bit contained in the converted bit sequence 4100 and located directly above that given dot is used to decode the bin located to the left of that given dot. For example, bins 0, 5, and 7 are each decoded by using the zeroth to third bits. In other words, three bits in bins 0, 5, and 7 are converted to the four bits at positions 0 to 3 in the bit sequence 4100.

As can be seen from the set of dots 4101, the bit sequence (bit 0 to bit 3) needed for decoding the last bin 5 belonging to block 1 appears in the output data bitstream 4100 earlier than the bit sequence (bit 7 and bit 8) needed for decoding the first bin 3 belonging to block 1. In this way, unlike the third embodiment, in the fourth embodiment, there are cases where the order of the bins in each block is reversed from the order of the corresponding bits in the output data bitstream.

The end bit of each block is as follows. As in the case where each block is encoded by CABAC, the first bit and end bit of the binarized version of the compressed data of the block are invariably a MbSkipFlag and an EndOfSliceFlag, respectively. When the picture contains w blocks, the output data bitstream invariably contains w MbSkipFlags and w EndOfSliceFlags.

In the present embodiment, however, the end bit of the variable-length encoded block x is the last bit of the word A whose position in the output data bitstream comes the latest among the words needed for decoding the respective bits in the binarized compressed data of the block x. In the example illustrated in FIG. 11, the end bit of each of blocks 0, 1, and 3 is the eighth bit in the bit sequence 4100 which is indicated by arrow 4200. Likewise, the end bit of block 3 is the 14th bit in the bit sequence 4100 which is indicated by arrow 4201.

FIG. 12 is a diagram for explaining the behavior of the bin encoding units and multiplexing unit in the variable-length encoding unit according to the fourth embodiment. The bin encoding units 704-1 to 704-K each convert an input bin sequence made up of bits having the same quantized LPB probability into a word by referring to a conversion map 800 for converting input bin sequences into corresponding output words. For simplicity of explanation, it is assumed that the multiplexing unit 705 uses the same conversion map for all the bin sequences input from the bin encoding units 704-1 to 704-K to the multiplexing unit 705. For example, the bin sequence "000" is converted to a word "1".

In the illustrated example, a probability index 802 indicating the quantized LPB probability is appended to each bit in the input bit sequence 801 by the probability quantizing unit 703. In the illustrated example, it is assumed that the LPB probability is quantized to one of four values, and each quantized LPB probability is associated with one of probability indices 0 to 3. The bits constituting the input bit sequence 801 are input in sequence, starting with the first bit 850, to the respective bin encoding units corresponding to the probability indices of the respective bits. For example, each bit whose probability index is "0" is input to the bin encoding unit 704-1, and each bit whose probability index is "1" is input to the bin encoding unit 704-2.

Tables 860 to 863 depict the data stored in the buffer of the multiplexing unit 705 when the bits 850 to 853 are input to the corresponding bin encoding units.

In the tables 860 to 863, each row corresponds to one entry stored in the buffer of the multiplexing unit 705. In each table, the entries are arranged from top to bottom in the order in which the entries were created. The multiplexing unit 705 outputs the words from the respective entries in the buffer sequentially, each in the form of an output data bitstream, by working from the top to the bottom. In each table, "#" indicates the index of each entry in the buffer. Further, "Idx" indicates the index of the corresponding bin encoding unit; in the illustrated example, for ease of understanding, the index of each bin encoding unit has the same value as the probability index appended to the input bit that is input to that bin encoding unit. "INPUT" indicates the input bit sequence (bin sequence). "WORD" indicates the word corresponding to the input bit sequence. If there is no corresponding word for the input bit sequence (for example, when the input bit sequence is "00"), the word is designated "N/A" in each table.

It is assumed that the buffer of the multiplexing unit 705 is empty until the bit 805 is input to the corresponding one of the bin encoding units 704-1 to 704-K.

When the bit is input to the corresponding bin encoding unit while the buffer of the multiplexing unit 705 is empty, the bin encoding unit creates a new entry in the buffer of the multiplexing unit 705. In the illustrated example, when the bit 850 whose probability index is "0" and whose value is "0" is input to the bin encoding unit 740-1, the first entry whose entry index is "0" is created in the buffer of the multiplexing unit 705, as depicted in the table 860. Since the probability index of the bit 850 is "0", "Idx" of this entry is "0". Further, since the value of the bit 850 is "0", the input bit sequence in the first entry is "0". The word in this entry is "N/A" because the word is not completed yet.

Next, the bit 851 whose probability index is "1" and whose value is "0" is input to the bin encoding unit 740-2. In this case, since the entry corresponding to the probability index of this bit does not exist in the buffer of the multiplexing unit 705, a new entry is created, as depicted in the table 861. "Idx" of this second entry is "1". The word in the second entry is "N/A" because the word is not completed yet.

After that, each time new bits are input to the corresponding bin encoding units, each of the bin encoding units 704-1 to 704-K and the multiplexing unit 705 convert the bin sequence stored at the corresponding entry in the buffer of the multiplexing unit 705 into a word in accordance with the following rules 1) to 4), and output the word as it becomes ready for output from the entry.

1) The bin encoding unit, 704-1 to 704-K, searches through the entries corresponding to the probability index of the input bit in ascending order of the entry indices in the buffer of the multiplexing unit 705.

2) If there is any entry in which the word is "N/A" among the entries corresponding to the probability index of the input bit, the bin encoding unit, 704-1 to 704-K, updates the input bit sequence stored at that entry. More specifically, the bin encoding unit, 704-1 to 704-K, adds the new input bit to the end of the input bit sequence stored at that entry. The multiplexing unit 705 checks to see if the updated bit sequence matches one of the bin sequences in the conversion map 800. If there is a matching bin sequence, the bin encoding unit, 704-1 to 704-K, determines the word in that entry by taking the word corresponding to that bin sequence.

3) If there is no entry in which the word is "N/A" and which corresponds to the probability index of the input bit, the bin encoding unit, 704-1 to 704-K, creates a new entry for that probability index.

4) Any entry in which the word is not "N/A" can be output as a bitstream as it becomes ready for output, but the entries are output in descending order of the entry indices in the buffer of the multiplexing unit 705. This is a limitation necessary to ensure that the multiplexed words will be correctly decoded at the motion video decoding apparatus (inverse conversion from the words to the corresponding bin sequences). If any entry whose entry index is smaller than that of the entry of interest, and whose word is "N/A", remains in the buffer of the multiplexing unit 705, the multiplexing unit 705 is not permitted to output the entry of interest even if the word in that entry is not "N/A".

When outputting any given entry, the multiplexing unit 705 adds the word stored in that given entry to the output data bitstream. The entry thus output is removed from the multiplexing buffer.

The table 862 illustrates the state of the buffer of the multiplexing unit 705 when the bit 852 whose probability index is "0" and whose value is "0" is input to the bin encoding unit 704-1. At this point, the entries whose entry indices are "1" to "4" are ready for output. However, since the word in the entry whose entry index is "0" is "N/A", the multiplexing unit 705 is not yet permitted to output all the entry words as the bitstream. This causes a delay in variable-length encoding.

The table 863 illustrates the state of the buffer of the multiplexing unit 705 when the bit 853 whose probability index is "0" and whose value is "1" is input to the bin encoding unit 704-1. At this point, the word in the entry whose entry index is "0" is no longer "N/A". The multiplexing unit 705 is now permitted to output all the entries whose entry indices are "0" to "4".

When a new entry is added immediately after outputting all the entries whose entry indices are "0" to "4", an index "5" is assigned to the new entry. That is, the entry index of any new entry is determined by adding 1 to the largest index among the indices of all the entries including the entries that have been output. The multiplexing unit 705 adds 1 to the entry index of the last entry that has been output in the bitstream, and stores the resulting value as the first output entry index FirstIndex of the next bitstream. FirstIndex is reset to 0 at the start of the picture encoding process.

Figure 13C:
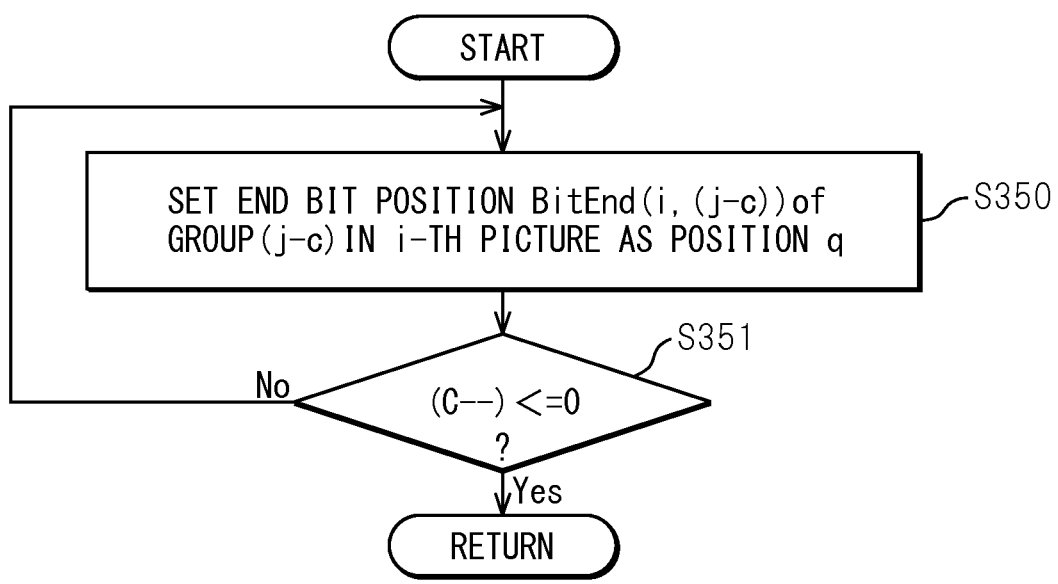

FIGS. 13A to 13C are a flowchart illustrating the process for identifying the end bit of each given group in the output data bitstream according to the fourth embodiment. The variable-length encoding unit 23 in the motion video encoding apparatus derives, in accordance with the following flowchart, the position BitEnd(i,j) of the end bit of the last block belonging to the j-th group G(i,j) in the i-th picture in the output data bitstream. When the bit corresponding to the position BitEnd(i,j) is input to the transmit buffer in the motion video encoding apparatus 10, the motion video encoding apparatus 10 determines that all the bits needed for decoding the group G(i,j) have been input to the transmit buffer in the motion video encoding apparatus 10.

The steps in the flowchart illustrated in FIGS. 13A to 13C are the same as the corresponding steps in the flowchart illustrated in FIGS. 9A to 9C, except for the steps described hereinafter. For example, the process of step S301 is the same as the process of step S201. Therefore, for the details of the steps other than the steps hereinafter described, refer to the corresponding description in the flowchart illustrated in FIGS. 9A to 9C.

A corresponding one of the bin encoding units 704-1 to 704-K in the variable-length encoding unit 23 encodes the b0-th bin, and stores the b0-th bin (if the bit sequence containing the b0-th bin can be converted, then the corresponding word) in the buffer of the multiplexing unit 705 (step S304). After that, the variable-length encoding unit 23 obtains the end bit position q of the bit sequence that the multiplexing unit 705 output as a bitstream (step S305). Further, the variable-length encoding unit 23 obtains the first entry index FirstIndex of the next bitstream from the multiplexing unit 705, and this index is denoted by t.

After that, if the carry count c is 1 or larger in step S306, the variable-length encoding unit 23 compares the end bit position p of the bitstream before the arithmetic encoding of the b0-th bin with the end bit position q of the bitstream after the arithmetic encoding of the b0-th bin. Further, the variable-length encoding unit 23 determines whether the first entry index t of the next bitstream is larger than the index s (step S307). The index s represents the largest entry index among the indices of the entries corresponding to EndOfSliceFlags that have already been arithmetic-encoded but have not yet been output in the bitstream.

If the end bit position p is different from the end bit position q, and if the index t is larger than the index s (Yes in step S307), this means that a new bit is generated by arithmetic-encoding the b0-th bin. In this case, the last word corresponding to the EndOfSliceFlag of the last block in the group x (x=j−1, . . . , j−c) that was previously arithmetic-encoded but not output in the bitstream is output in the bitstream. That is, all the bits needed for decoding the group x have been output at position q. Then, the variable-length encoding unit 23 sets, as the bit position q, the end bit position BitEnd( ) of the bit sequence needed for decoding the group that has been output here (step S308).

On the other hand, if the end bit position p is the same as the end bit position q, or if the index t is equal to the index s (No in step S307), no new bit is generated. Therefore, the variable-length encoding unit 23 proceeds to step S310 without processing steps S308 and S309.

As illustrated in FIG. 13B, the variable-length encoding unit 23 arithmetic-encodes EndOfSliceFlag (step S312), and thereafter obtains the end bit position q of the bitstream after the arithmetic encoding of EndOfSliceFlag (step S313). Further, the variable-length encoding unit 23 obtains the first entry index FirstIndex of the next bitstream from the multiplexing unit 705, and this index is denoted by t. The variable-length encoding unit 23 further obtains, from the multiplexing unit 705, the largest entry index among the indices of the entries corresponding to EndOfSliceFlags that have already been arithmetic-encoded but have not yet been output in the bitstream; this index is denoted by s.

The variable-length encoding unit 23 determines whether or not the carry count c is 1 or larger and whether the end bit position p of the bitstream before the arithmetic encoding of EndOfSliceFlag is different from the end bit position q of the bitstream after the arithmetic encoding of EndOfSliceFlag. Further, the variable-length encoding unit 23 determines whether the index t is larger than index s (step S314). If the carry count c is 1 or larger, and p is different from q, and if t is larger than s (Yes in step S314), this means that the EndOfSliceFlag of the last block in the group x (x=j−1, . . . , j−c) is output in the bitstream. That is, all the bits needed for decoding the group x have been output in the bitstream. Then, the variable-length encoding unit 23 sets, as the bit position q, the end bit position BitEnd( ) of the bit sequence needed for decoding the group that has been output here (step S315).

On the other hand, if the carry count c is 0, or p is the same as q, or if t is equal to s (No in step S314), this means that all the bits needed for decoding the group x are not output yet. Therefore, the variable-length encoding unit 23 skips steps S315 and S316, and proceeds to determine whether the current block m is the last block in the group j (step S317). If the current block m is not the last block in the group j (No in step S317), this means that there remain one or more blocks to be processed in the group j. Then, the variable-length encoding unit 23 increments m by 1 and repeats the process from step S302 onward.

On the other hand, if the current block m is the last block in the group j (Yes in step S317), the variable-length encoding unit 23 increments m by 1. Then, the variable-length encoding unit 23 compares the end bit position p of the bitstream before the arithmetic encoding of EndOfSliceFlag with the end bit position q of the bitstream after the arithmetic encoding of EndOfSliceFlag, and also compares the index t with the index s (step S318).

If p is different from q, and if t is larger than s (Yes in step S318), this means that a new bit is generated by arithmetic-encoding the EndOfSliceFlag. This therefore means that all the bits needed for decoding the last block in the group j have been output in the bitstream. Then, the variable-length encoding unit 23 sets, as the bit position q, the end bit position BitEnd( ) of the bit sequence needed for decoding the group j that has been output here (step S319).

On the other hand, if p is the same as q, or if t is equal to s (No in step S318), no new bit is generated by arithmetic-encoding the EndOfSliceFlag. Accordingly, the variable-length encoding unit 23 increments the carry count c by 1 and also increments the group index j by 1 (step S321).

As has been described above, the motion video encoding apparatus can reduce the decoding delay by dividing the picture into blocks and classifying the blocks into groups and by adjusting the amount of code of the blocks in each group in accordance with the decode time estimated for that group.

A computer program which is executed on a computer to implement the functions of the various units constituting the motion video encoding apparatus according to each of the above embodiments or their modified examples may be distributed in the form stored in a semiconductor memory or in the form recorded on a recording medium such as an optical recording medium.

The motion video encoding apparatus according to each of the above embodiments or their modified examples is used in various applications. For example, the motion video encoding apparatus is incorporated in a video camera, a video transmitting apparatus, a video receiving apparatus, a videophone system, a computer, or a mobile telephone.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A motion video encoding apparatus for encoding each picture contained in motion video data by dividing a picture into a plurality of blocks, comprising:
   a processor configured to:
      determine to which of a plurality of groups each block belongs;
      compute, for each of the groups, a difference between a decode time corresponding to each block of a group and a decode time corresponding to each block of an immediately preceding group, as decode time information of the group;
      append group information identifying the group to which each block belongs to and the decode time information for each of the groups data to be output;
      control an amount of code for each block contained in the group so that data needed for decoding all the blocks contained in the group will arrive at a stream receive buffer provided in a motion video decoding apparatus by the decode time of the group when the data is transmitted to the motion video decoding apparatus at a prescribed transmission rate; and
      encode each block, based on control information concerning the amount of code.

2. The motion video encoding apparatus according to claim 1, wherein the computing the decode time information computes the decode time information for each of the groups so that a difference value computed between the decode time of a first group among the plurality of groups in a picture being encoded and the decode time of a last group among the plurality of groups in a picture immediately preceding the picture being encoded becomes larger than a difference value computed between any two successive groups among the second and subsequent groups in the picture being encoded.

3. A motion video encoding method for encoding each picture contained in motion video data by dividing a picture into a plurality of blocks, comprising:
   determining to which of a plurality of groups each block belongs;
   computing, for each of the groups , a difference between a decode time corresponding to each block of the group and a decode time corresponding to each block of an immediately preceding group, as decode time information of the group;
   appending group information identifying the group to which each block belongs to and the decode time information for each of the groups data to be output;
   controlling an amount of code for each block contained in the group so that data needed for decoding all the blocks contained in the group will arrive at a stream receive buffer provided in a motion video decoding apparatus by the decode time of the group when the data is transmitted to the motion video decoding apparatus at a prescribed transmission rate; and
   encoding each block, based on control information concerning the amount of code.

4. The motion video encoding method according to claim 3, wherein the decode time information for each of the groups is computed so that a difference value computed between the decode time of a first group among the plurality of groups in a picture being encoded and the decode time of a last group among the plurality of groups in a picture immediately preceding the picture being encoded becomes larger than a difference value computed between any two successive groups among the second and subsequent groups in the picture being encoded.

5. A non-transitory computer-readable storage medium storing a computer program to cause a computer to execute a process for encoding each picture contained in motion video data by dividing a picture into a plurality of blocks, the process comprising:
   determining to which of a plurality of groups each block belongs;
   computing, for each of the groups, a difference between a decode time corresponding to each block of the group and a decode time corresponding to each block of an immediately preceding group, as decode time information of the group;
   appending group information identifying the group to which each block belongs to and the decode time information for each of the groups data to be output;
   controlling an amount of code for each block contained in the group so that data needed for decoding all the blocks contained in the group will arrive at a stream receive buffer provided in a motion video decoding apparatus by the decode time of the group when the data is transmitted to the motion video decoding apparatus at a prescribed transmission rate; and
   encoding each block, based on control information concerning the amount of code.

6. The non-transitory computer-readable storage medium according to claim 5, wherein the decode time information for each of the groups is computed so that a difference value computed between the decode time of a first group among the plurality of groups in a picture being encoded and the decode time of a last group among the plurality of groups in a picture immediately preceding the picture being encoded becomes larger than a difference value computed between any two successive groups among the second and subsequent groups in the picture being encoded.

* * * * *